United States Patent
Verstegen et al.

(10) Patent No.: US 10,059,794 B2
(45) Date of Patent: Aug. 28, 2018

(54) POLYURETHANE FOAM COMPOSITION

(71) Applicant: SOUDAL, Turnhout (BE)

(72) Inventors: John Verstegen, TN Veldhoven (NL); Bart Vervoort, Poederlee (BE); Peter Geboes, Aartselaar (BE)

(73) Assignee: SOUDAL, Turnhout (BE)

( * ) Notice: Subject to any disclaimer, the term of this patent is extended or adjusted under 35 U.S.C. 154(b) by 0 days.

(21) Appl. No.: 14/357,927

(22) PCT Filed: Nov. 14, 2012

(86) PCT No.: PCT/EP2012/072642
§ 371 (c)(1),
(2) Date: May 13, 2014

(87) PCT Pub. No.: WO2013/072380
PCT Pub. Date: May 23, 2013

(65) Prior Publication Data
US 2014/0309323 A1  Oct. 16, 2014

(30) Foreign Application Priority Data
Nov. 16, 2011 (EP) .................................... 11189441

(51) Int. Cl.
| | |
|---|---|
| *C08G 18/12* | (2006.01) |
| *C08G 18/30* | (2006.01) |
| *C08G 18/65* | (2006.01) |
| *C08G 18/76* | (2006.01) |
| *C08G 18/80* | (2006.01) |
| *C08G 18/28* | (2006.01) |
| *C08G 18/32* | (2006.01) |
| *C08G 18/48* | (2006.01) |
| *C08K 5/01* | (2006.01) |
| *C08K 5/02* | (2006.01) |
| *C08K 5/06* | (2006.01) |
| C08G 101/00 | (2006.01) |

(52) U.S. Cl.
CPC ......... *C08G 18/7671* (2013.01); *C08G 18/12* (2013.01); *C08G 18/2805* (2013.01); *C08G 18/2825* (2013.01); *C08G 18/32* (2013.01); *C08G 18/48* (2013.01); *C08G 18/8019* (2013.01); *C08G 18/8029* (2013.01); *C08G 18/8064* (2013.01); *C08K 5/01* (2013.01); *C08K 5/02* (2013.01); *C08K 5/06* (2013.01); *C08G 2101/00* (2013.01)

(58) Field of Classification Search
CPC .. C08G 18/2815–18/2845; C08G 18/10–18/12
See application file for complete search history.

(56) References Cited

U.S. PATENT DOCUMENTS

| | | | |
|---|---|---|---|
| 4,863,994 A | 9/1989 | Nelson et al. | |
| 5,817,860 A * | 10/1998 | Rizk ...................... | C08G 18/10 521/159 |
| 5,880,167 A | 3/1999 | Krebs et al. | |
| 2006/0079661 A1* | 4/2006 | Zhu ......................... | C08G 18/12 528/44 |
| 2010/0152381 A1* | 6/2010 | Savino et al. ................ | 524/872 |

FOREIGN PATENT DOCUMENTS

| | | | | |
|---|---|---|---|---|
| CA | 2198388 A1 * | 2/1996 | ......... | C08G 18/2805 |
| DE | 10311607 A1 * | 9/2004 | ............. | C08G 18/10 |
| EP | 2 383 304 A1 | 11/2011 | | |
| GB | 2160881 A * | 1/1986 | ......... | C08G 18/2815 |
| WO | 02/090410 A2 | 11/2002 | | |

OTHER PUBLICATIONS

Petrovic, Z. S. Polyurethanes. Handbook of Polymer Synthesis: Second Edition. CRC Press 2004.*
Machine Translation of DE10311607A1. Sep. 23, 2004.*
Written Translation of DE10311607A1. Sep. 23, 2004.*
Polyisocyanates and Prepolymers. Covestro Deutschland AG. 2017.*
PAPI 94 Polymeric MDI MSDS. Dow Chemical Company. Oct. 2, 2015.*

* cited by examiner

*Primary Examiner* — Stephen E Rieth
(74) *Attorney, Agent, or Firm* — Sughrue Mion, PLLC

(57) ABSTRACT

Disclosed is a polyurethane foam composition based on polyisocyanates comprising initially at least 20 wt % mMDI and at most 24.5 wt % mTDI, a towards isocyanate polyfunctional and a towards isocyanate monofunctional compound, which composition contains
a) less than 1.00 wt % residual free mMDI,
b) at least 0.4 wt % total of mMDI of which at least one isocyanate group has been reacted with a monofunctional compound,
c) wherein the polyurethane prepolymer composition is having an isocyanate index of at least 105 and at most 350,
d) wherein the equivalents ratio of functional groups of the monofunctional compounds relative to the amount of the isocyanate functional groups initially present is at least 6.5%, and
e) wherein the equivalents ratio of towards isocyanate tri- and higher functional reactive compounds relative to the isocyanate functional groups initially present is at most 6.50%.
Further disclosed is a suitable prepolymer, production methods and uses.

30 Claims, No Drawings

POLYURETHANE FOAM COMPOSITION

CROSS REFERENCE TO RELATED APPLICATIONS

This application is a National Stage of International Application No. PCT/EP2012/072642, filed on Nov. 14, 2012, which claims priority from European Patent Application No. 11189441.6, filed on Nov. 16, 2011, the contents of all of which are incorporated herein by reference in their entirety.

FIELD OF THE INVENTION

The present invention relates to polyurethane (PU) formulations containing polymers based on polyisocyanates in combination with other towards isocyanate polyfunctional reactive compounds, such as polyhydric alcohols, and the various uses of such formulations. More particularly, the invention relates to formulations in which the content of residual methylene diphenyl diisocyanate (MDI) monomer is very low.

BACKGROUND OF THE INVENTION

Polyurethane formulations find widespread use, in particular in the construction industry. They are for instance used as adhesives, such as for mounting doors and window frames, as mastics and sealants, such as for sealing and insulation purposes. The formulations may foam upon application or they may not foam. They may also initially foam and subsequently collapse, and thus not end up as foam. Foaming formulations may lead to a foamed end product, and this may have closed cells or open cells. The foam formed may also be made to collapse and end up as a high density layer. The formulations are typically produced and offered in pressurized containers, cans or vessels. For more sophisticated applications, the formulations may be pumped from containers or be pushed out of those containers by putting these under pressure by means of an external pressure gas.

A polyurethane (PUR or PU) is a polymer composed of a chain of organic units joined by the carbamate or urethane link. PU polymers are formed through step-growth polymerization, by reacting one or more monomers having at least two isocyanate functional groups with at least one other monomer having at least two isocyanate reactive groups, i.e. functional groups which are reactive towards the isocyanate function. The isocyanate (—N=C=O or "NCO") functional group is highly reactive and is able to react with many other chemical functional groups. In order for a functional group to be reactive to an isocyanate functional group, the group typically has at least one hydrogen atom which is reactive to an isocyanate functional group. Most frequently compounds are used having at least two hydroxyl or alcohol groups. Where di-isocyanate molecules are reacting with other difunctional molecules, so-called "linear" polymers are formed. Where at least one of the isocyanates or one of the other molecules has three or more functional groups, the polymer structure is able to cross-link and form three-dimensional structures. The structures with a low degree of cross-linking lead to the more elastic products. For adhesives on the other hand, polymer structures with ultimately a high degree of cross-linking are preferred.

The reaction of an isocyanate monomer with a second reactant may be favoured by the presence of one or more catalysts. Suitable catalysts are amine compounds, typically tertiary amines, and organometallic compounds.

Also water is reactive towards the isocyanate function, and typically plays a role in the final curing of the polymer towards the formation of an ultimately rigid structure. The final "curing" of the polyurethane polymer, which may include further chain building as well as cross-linking, is often obtained at least partly by reaction with water, such as with atmospheric moisture or with moisture present in the substrate onto which the PU formulation is applied. An isocyanate functional group may react with water followed by liberating gaseous $CO_2$ to form a primary amine, a functional group which is able to react at least once with more isocyanate functional groups. This mechanism thus also may lead to cross-linking in the polymer. The liberated $CO_2$ may act as a (secondary) foaming agent. Thanks to this mechanism a polyurethane polymer structure with residual isocyanate functionality is able to cure or harden under the influence of atmospheric moisture, and depending on mixture viscosity at the same time may even foam further.

In a one component system, a polyurethane foam pressure container may for instance be prepared by introducing a mixture of towards isocyanate polyfunctional reactive compounds, typically higher molecular weight polyols and more typically polyether polyols, together with a stoichiometric excess of polyfunctional isocyanates into the can, and by giving the mixture sufficient time and shaking to mix the can content well, and to have it react until all towards isocyanate reactive functions are substantially reacted away and substantially only free isocyanate functions remain available. The so-formed viscous liquid mixture, regardless whether it is in the can or in a reaction vessel, is usually called a "prepolymer". Propellant gasses may be added, optionally together with the reactants, to provide a pressure in the can, if desired. When using liquefied gasses such as LPG-type components or dimethyl ether (DME) as the propellants, these gasses may also act as a solvent for the other components in the mixture.

The application of the polyurethane then consists of releasing the viscous prepolymer mixture from the pressurized can and let it cure, in a one component foam formulation (OCF) by the reaction with atmospheric moisture and optionally also with water from a wet or moist substrate. The propellant gasses, together with the liberating $CO_2$, may provide a foaming effect upon the expansion of the prepolymer to atmospheric pressure. The addition to the mixture of a stabilizer may help because such a component may act as a nucleator for starting the formation of gas bubbles, into which the propellants and the $CO_2$ may then migrate. The curing reactions further increase the viscosity of the reacting mixture, which eventually sets as a solid polyurethane. The rate of curing is usually much faster than the rate at which the gasses are able to escape from the solidifying mixture, such that usually a solid foam structure is obtained.

In a two component system, the prepolymer with its remaining free isocyanate functionality is at the moment of application mixed with a second component containing a hardener, i.e. a polyfunctional isocyanate reactive compound, typically a low molecular weight polyol, preferably a component having primary alcohol functions, which is introduced from a second container. The result is a very fast curing mixture forming a high density product with high mechanical properties, very suitable for mounting doors and window frames. Optionally some water may be added to the polyol, which causes $CO_2$ to form, and in which case propellants may not be essential in order to obtain a foam.

The stoichiometric ratio of the isocyanate functionality relative to the isocyanate reactive functionality in the mixture is usually referred to as the "index" of the prepolymer, i.e. the molar ratio, often being expressed as a percentage and possibly even without mentioning the percentage indicator, of all isocyanate functional groups present in the prepolymer mixture relative to the total number of functions reactive towards an isocyanate functional group, and this prior to the occurrence of any condensation reaction. The isocyanate index for a formulation is thus a measure of the excess isocyanate functionality used relative to the theoretical equivalent amount required.

The result of the reaction as described for forming the prepolymer is typically a mixture of unreacted monomers and chain-growth condensation products having various chain lengths, typically following a Schultz-Flory distribution. With the isocyanates having been in stoichiometric excess, practically all left over monomers are polyisocyanates. The "index" of the mixture strongly determines the shape of the molecular weight distribution curve, which will heavily affect the product viscosity, and the residual amount of free monomer. A lower index leads to a broader distribution and lower residual monomer content, but at the same time also to a higher viscosity reaction product. A higher index leads to a lower viscosity reaction product, but with a higher residual monomer content. The mixture which is formed in the pressure container should end up having a viscosity which is sufficiently low to allow it to be dispensed from the can. Low index prepolymers are therefore more difficult to work into suitable formulations for polyurethane foam canisters.

Well known polyisocyanates are isophorone diisocyanate (IPDI), toluene diisocyanate (TDI), naphthalene-1,5-diisocyanate (NDI), hexane-1,6-diisocyanate (HDI) and in particular the methyl diphenyl diisocyanates (MDI), more preferably the 2,2'-, the 2,4'- and the 4,4'-isocyanate isomers thereof.

The polyisocyanates are commercially available in a variety of forms. Due to their method of production, most of the commercial products are mixtures of diisocyanates with isocyanates having 3 and more isocyanate functional groups per molecule, i.e. with a higher functionality. The average functionality of the mixture of polyisocyanates used in the formulation is therefore one element which may influence the degree of cross-linking in the ultimate polyurethane polymer structure.

A very common commercial form of MDI is so-called crude MDI or polymeric MDI (pMDI). It is a mixture of polyfunctional isocyanate monomers having a different number of phenyl isocyanate functions. The diisocyanate monomer with its two phenyl cores typically makes up close to half of the mixture, the rest being 3-core, 4-core, 5-core, and higher monomers, each phenyl core typically offering one isocyanate functionality. The average functionality of pMDI is typically about 2.7.

Also the polyfunctional towards isocyanate reactive compound may have more than two reactive functions per molecule, or may be a mixture of compounds having a different number of functionalities. The average functionality of the polyfunctional towards isocyanate reactive compound or of the mixture of polyfunctional towards isocyanate reactive compounds is therefore another important element which may influence the degree of cross-linking obtainable in the ultimate polyurethane polymer structure.

The more popular polyols used in polyurethanes are polyether polyols, usually made by the reaction of epoxides (oxiranes) with an active hydrogen containing starter compound, and to a lesser degree also polyester polyols, which may be formed by the polycondensation of multifunctional carboxylic acids and hydroxyl compounds.

The nature of the towards isocyanate reactive compound, not only its average functionality, may also be important for the final properties of the polyurethane product formed. The polyfunctional towards isocyanate reactive compounds may for that purpose for instance be classified according to the functionality of the compound and to their molecular weight.

For a number of reasons, such as a better control of the final mixture obtained in the can after reaction, or of the foam properties, for obtaining a formulation giving a faster final cure and less heat generation when the reactants are mixed together in the pressure can or container, polyurethane formulations may make use of an externally synthesized prepolymer. These are prepared in a similar way as the prepolymer in the can described above, i.e. as a mixture of unreacted polyisocyanate monomers and polymers thereof obtained by step-growth condensation, following a Schultz-Flory distribution. The properties of these prepolymers may be influenced by their index and by the choice of the starting materials, such as the selection of the polyisocyanate and/or of the polyol, or by using mixtures of them.

Such prepolymers are available commercially. Popular examples are made by reacting monomeric MDI (mMDI) or the cheaper crude MDI with a small amount of diols and/or triols. These conventional commercial prepolymers typically still contain significant amounts of the diisocyanate monomer.

Recently, the presence of free diisocyanate monomers which remain as a residual component in the formulation at the moment of application of the PU composition, has become of concern. The diisocyanate monomer has a relatively low molecular weight and molecular size, and a relatively high vapour pressure as compared to most other formulation ingredients, including its higher functionality homologues. They are therefore relatively mobile, and are able to migrate from the formulation into its surroundings, such as the surrounding air, or into liquids or solids which are in contact with the formulation. Because of the high reactivity of the isocyanate functional group, these compounds may be harmful, due to their possible irritant, allergenic and/or toxic effects. This has therefore generated environmental, industrial health and toxicity concerns.

In view of this reactivity and mobility concern, formulators have already selected to preferably use methyl diphenyl diisocyanate (MDI) over other monomers having a lower molecular weight, such as IPDI, TDI or HDI. The use of polymeric MDI and/or prepolymers made thereof has further reduced the remaining presence of the 2-phenyl core diisocyanate monomer, including the three structurally different isomers, in the commercially offered product, which are with these starting materials the compounds of particular concern.

In certain countries, this concern has already lead to legislation which imposes enhanced safety measures, such as for increased ventilation, for the working area where the formulations are being applied, and which prescribes the use of toxicity labels and risk phrases (R40) on commercially offered packages with formulations containing the diisocyanate monomer at concentrations above a specified level. Recent EU legislation for instance, imposes the R40 risk phrase on packages containing formulations with a residual monomer MDI content of at least 1.0 wt %. Because the residue in used conventional PU foam containers may still contain as much as 15% residual free MDI monomer, these used containers may under many legislations have to be discarded as toxic waste.

Various methods have therefore been proposed for obtaining low residual levels of free diisocyanate monomers in the formulation, thereby reducing the concerns associated with using polyurethane formulations, and where possible, at least avoiding the R40 risk phrase.

WO 03/006521 A1 describes the use of asymmetric polyisocyanates in building the prepolymer. With asymmetric polyisocyanates, the different isocyanate functional groups in the monomer have a different reactivity. The lower reactivity functional groups will tend to survive as part of the prepolymer chain, and the higher reactivity monomer will tend to react away faster. This allows obtaining a prepolymer with lower monomer content for the same index, or a prepolymer having a lower viscosity for the same residual monomer content. The possibilities for generating suitable viscosity prepolymers having the desired low monomer content with this method remain however limited. Also the asymmetric polyisocyanates are rather difficult and costly to obtain. The prepolymers produced are also slower in the cross-linking reactions, which is another drawback.

WO 2007/115971 proposes to remove a major portion of the diisocyanate molecules from the pMDI mixture before forming the prepolymer. The document describes the preparation of a low monomer containing MDI oligomer mixture from technical grade MDI or from polymeric MDI (pMDI) by removing most of the MDI monomer by distillation. This separation is rather difficult and in order to avoid excessive temperatures, at which the molecules may degrade, makes use of sophisticated equipment such as a thin film, falling film or wiped film evaporator, operating under relatively deep vacuum. The amount of diisocyanate monomer to be removed is also significant. WO 2007/115971 further proposes to increase the molecular weight of the starting polyisocyanate mixture by increasing the average number of phenyl groups. This however leads to undesired byproducts, such as uretonimine, which needs to be removed, such as by extraction. This adds significant further complexity to the overall process.

Another proposal is described in several documents, including WO 00/04069, WO 2011/036018 and WO 01/014443, and exists in removing diisocyanate monomers from the prepolymer by distillation. Also this separation is difficult, and again a thin film, falling film or wiped film evaporator is proposed, usually under a deep vacuum.

These distillations require a complex additional step in the production process. Also, removing the lower molecular weight diisocyanate monomers increases the viscosity of the remaining stream significantly. WO 01/40340 proposes to add an inert solvent whose boiling point is slightly below that of the monomeric diisocyanate in order to facilitate the distillation. WO 02/079291 and WO 02/079292 propose the addition into the prepolymer mixture before distillation of an extra low viscosity and high boiling component which must be non-reactive towards isocyanate and hydroxyl groups, in order to alleviate this problem of viscosity increase. In order for the prepolymer remaining after distillation to have a sufficiently low viscosity, the upstream prepolymer reaction must be performed with a relatively high index, i.e. with a high excess of polyisocyanates, which means that the amount of residual monomer in the prepolymer mixture is typically still very high, possibly 50-60 wt %, or even as high as 80 wt %. The amount of monomer to be removed is thus very high, and this also makes it very difficult to obtain the low monomer levels desired. This extra step in the production process is therefore very complex and has a relatively low product yield. It is also a significant consumer of heat at a relatively high temperature level. Because of the complex equipment and the energy consumption, this additional step is expensive.

EP 1674492 proposes to use such monomer-poor pMDI, with a rest content of 0.2 wt % of monomeric MDI (mMDI), in the preparation of a prepolymer which is later used in a PU foam formulation. EP 1674492 discloses in the preparation of the polyol component the addition of an NCO prepolymer, named Komponente (ii), to which a small amount of diaceton alcohol is added as a chain regulator. The polyol component is subsequently reacted with the monomer-poor pMDI described above. The presence of mMDI in the preparation of EP 1674492 is so low that when all mMDI reacts twice with the diaceton alcohol, the concentration of this reaction product in the prepolymer composition is not higher than 0.441 wt %, and because of dilution not more than 0.331 wt % in the PU foam composition contained in the pressure container.

Several other documents also describe the use of monofunctional towards isocyanate reactive compounds in PU formulations.

EP 125008 describes the preparation of a polyurethane prepolymer by first reacting pure 4,4'-diphenyl methane diisocyanate with as polyol a linear polyester, to form an intermediate having an index of 1.83. In a second step, a small amount of 2-ethyl hexanol, equivalent to only 10% of the isocyanate functions remaining after the first reaction and representing less than 4.7% of all the isocyanate functional groups involved in forming the polyurethane prepolymer composition. The prepolymers of EP 125008 are formulated into a hot melt adhesive composition.

US 2010/0152381 is concerned with providing prepolymer systems having reduced monomeric isocyanate contents, and which may be useful in preparing articles, such as water-blown polyurethane foams. Monomeric isocyanate contents of no greater than about 10% by weight are considered as being reduced. The document proposes to prepare diluent components by reacting a polymethylene polyphenyl polyisocyanate (pMDI) comprising a monomeric MDI content of from 28 wt % to 33 wt % in stoichiometric excess with 2-ethylhexanol or with n-butanol, in the presence of a plasticizer and in the absence of any polyol. The diluent components obtained reached a monomeric isocyanate content as low as 4.3 wt %. In parallel, prepolymer components were prepared from the same polyisocyanate and a polyol, without any mono-alcohol, and which were able to reach a monomeric isocyanate content as low as 3.8 wt %. The prepolymer component having this low MDI content was characterized by an index, as defined elsewhere in this document, of 322. The so obtained prepolymer compositions were blended with the diluent components to form prepolymer compositions in which a monomeric isocyanate content as low as 4.0 wt % was reached. In a comparative example, the same polyisocyanate was simultaneously reacted with 2-ethylhexanol and with a polyol, employing an index of 552, and a higher viscosity prepolymer composition was obtained which contained 7.01 wt % monomeric isocyanate. US 2010/0152381 states in paragraph [0025] that, generally, increasing an amount of the monohydric isocyanate-reactive component relative to the isocyanate component, based on a stoichiometric ratio of OH functional groups to NCO functional groups, decreases the monomeric isocyanate content of the diluent component. US 2010/0152381 however remains silent about how the recently desired very low monomeric isocyanate contents may be achieved in the prepolymer component, or in the prepolymer compositions, or in any further formulation from which a foamed article may be produced.

U.S. Pat. No. 5,880,167 discloses the preparation of prepolymers for hotmelt adhesives, which may also be used for the production of foam plastics from non-reusable pressurized containers. In order to obtain a low content of monomeric volatile isocyanates (essentially diisocyanates), U.S. Pat. No. 5,880,167 proposes to use trifunctional isocyanate monomers, of which the functionality has been reduced by the addition of benzyl alcohol as a terminator. The prepolymers according to this proposal were compared with control examples wherein the trifunctional isocyanate and the benzyl alcohol, together, were replaced by dimethyl methane diisocyanate (MDI) and in which benzyl alcohol was absent. The trifunctional isocyanate monomer could possibly be a mixture containing less than 20 wt % of diisocyanate, based on the weight of the polyisocyanates. The prepolymers based on the trifunctional isocyanate monomers and the benzyl alcohol each time ended up with a significantly lower residual monomeric isocyanate content as compared to their counterparts based on only MDI. U.S. Pat. No. 5,880,167 is silent about any possible effect when benzyl alcohol is combined with polyisocyanates containing at least 30 wt % of diisocyanate.

WO 02/090410 discloses the addition, in the preparation of the prepolymer, of 1-methoxy-2-propanol as a chain terminator, thereby increasing the shelf life of the prepolymer product and lowering the viscosity, and in addition increasing the proportion of open cells in the resulting foam. The amount of monofunctional alcohol used remains rather low, as it represents only 6.12% in equivalents relative to the presence of NCO groups in the prepolymer reaction. The prepolymer may be used in a one component PU foam composition. WO 02/090410 is not concerned with remaining free diisocyanate monomers in the prepolymer or in the foam composition.

U.S. Pat. No. 4,863,994 is concerned with providing reaction injection molded (RIM) parts made from polyurethanes, and proposes the addition of a monohydric alcohol into the reaction blend of the polyols and the polyisocyanate. The document states in column 5, lines 10-17, that the efficacy of the monohydric alcohol in solubilizing all the blend components and to lower blend viscosity will increase with increasing linear molecular conformation, or in simpler terms, with longer molecular distance between the hydroxyl function and the end of the molecule. U.S. Pat. No. 4,863,994 proposes in the examples to use a butyl alcohol initiated polyethyleneoxy-polypropyleneoxy monohydric alcohol with an equivalent weight of 500 in a blend having an isocyanate to active hydrogen ratio of 1.05.

U.S. Pat. No. 5,990,257 discloses various ways to prepare high molecular weight urethane polymers which are end-capped with alkoxyfunctional silanes, i.e. wherein the residual NCO content was brought down to zero and replaced by silane functions. These silylated polyurethanes are able to cure into a siloxane-crosslinked polymer network and are shown to be useful in sealant systems. WO 00/04069 discloses in Example 1 how an alkoxy silane terminated polyurethane prepolymer based on IPDI may be used to provide a suitably performing one component foam (OCF) composition.

US 2010/130674 proposes to react the polyurethane polymer with a compound comprising a group carrying an active hydrogen, such as a hydroxyl group or a mercapto group or a secondary amino group, together with at least one blocked or capped amino group selected from a limited list. The blocked or capped amino group is provided in order to maintain the double functionality when the compound reacts with a diisocyanate monomer, such that the reaction product remains available for incorporation into the high molecular weight polymer which forms during curing. The blocked or capped amino group is, upon exposure to moisture from a substrate or from open air, supposed to at least partially hydrolyze such that the amino group may react with isocyanates and lead to more cross-linking. The additional reagents however are complex, scarce and expensive, and the addition adds significant complexity and cost to the production process and to the resulting product. The method is therefore only economically affordable with prepolymers having a very low NCO value and technically allowable in applications whereby the reaction of NCO with moisture may be slower.

EP 2383304 A1 is also concerned with providing OCF compositions having a low free monomeric MDI content, because of toxicity concern. EP 2383304 proposes to add a significant amount of 2-ethyl hexanol into the composition, compensated with high amounts of triol components, which bring extra cross-linking. At the same time also a significant amount of a bi-functional alcohol having a molecular weight not greater than about 100 g/mol is added as extra hardener, and very high amounts of blowing agents and flame retardant are used, which bring extra dilution. The examples in EP 2383304 also add a significant amount of crude toluene diisocyanate (TDI) (80/20), an isocyanate which is even more volatile and of even higher toxicity concern than MDI, and of which the 2,4-isomer introduces an extremely highly reactive NCO group (i.e. the one located at the 4-position in the benzene ring of the TDI). EP 2383304 A1 states that its exemplified embodiments yield less than 1 wt % free monomeric MDI, but remains silent about any remaining free TDI monomer, which would actually be of even higher concern. The document further provides no analytical results in support of its alleged achievement, nor does it specify what analytical method would be appropriate for determining the content of free monomers. The applicants submit that, in view of the difficulties which need to be overcome in reaching a reliable concentration of less than 1.00 wt % of mMDI, some of which are explained further in this document, EP 2383304 A1 is a non-enabling disclosure because it is not supported by the very specifics about how the mMDI concentrations in the experimental results have to be determined, and an experimental result demonstrating that the alleged result was actually reached.

The applicants hereby report of an analytical test programme in which 6 different samples of PU compositions were analysed by 7 different labs, using methods based on three different analytical principles, i.e. High Performance Liquid Chromatography using a UV detector (HPLC/UV), HPLC coupled with Mass Spectroscopy (HPLC/MS), and GPC using a UV detector. We obtained 9 results for each sample, as some of the labs applied more than one different method. None of the analysis gave more than 1.3 wt % mMDI in any of the samples. The samples were thus very representative for the commercial target of having less than 1.00 wt % mMDI. The test results however showed significant differences between the analytical results. For one sample the results differed from 0.6 wt % up to 1.20 wt %, thus with a factor 2.0, the average being 0.94 wt %. For a second sample the results differed from 0.73 to 1.04 wt %, thus with a factor 1.42, the average being 0.94 wt %. For a third sample the results differed from 0.37 wt % up to 0.91 wt %, thus with a factor as high as 2.46, the average being 0.62 wt %. The applicants conclude that the same sample may give widely different mMDI contents depending on the analytical method and the lab that is chosen for the analysis. The applicants therefore submit that a specification of a particular concentration of mMDI in a PU foam composition is thus non-enabling without a clear specification what the analytical method is that should be used.

WO 2012/101220 A1, and its priority document EP 2481764 A1 which was filed on 27 Jan. 2011, both of which published August 2012, are also concerned with providing OCF compositions having a low free monomeric MDI content. The documents propose to include in the composition, together with crude MDI and 2-ethyl hexanol, a significant amount of an NCO end-capped TDI prepolymer prepared by end-capping with mTDI a polyol having a molecular weight of 3000 that was obtained by reacting an oxypropylene polyether chain with glycol. In example 1 of these publications, the PU foam composition contains 6.76 equivalents % of triols relative to all the isocyanate functions present. In example 2, TDI is present as at least 3.47 wt % relative to all polyisocyanates initially present. The effect of adding the NCO end-capped TDI prepolymer is that the total composition is diluted such that the mMDI concentration is reduced. A drawback is that there may be residual mTDI present in the prepolymer, because the end-capping step requires an excess of mTDI relative to the free alcohol functions present, a monomer which is more volatile than the mMDI which is currently of regulatory concern. The teaching of these documents thus risks to replace the problem of residual mMDI by an even greater problem of residual mTDI. The documents also specify that the NCO end-capped prepolymers of TDI should be prepolymerized prior to their addition to the mixture. This adds an additional step to the preparation of the composition, and hence increases the complexity of the production process. These two documents describe examples which obtain OCF compositions that allegedly yield less than 1 wt. % free monomeric MDI, they however do not specify what analytical method should be used. The applicants submit that therefore the disclosures in these two documents are also non-enabling disclosures.

There therefore remains a need for polyurethane foam formulations having a low residual content of diisocyanate monomer and which also has a viscosity suitable for applying from a pressurized container, and which is obtainable by a process which is simple and low cost.

The present invention aims to obviate or at least mitigate the above described problems and/or to provide improvements generally.

SUMMARY OF THE INVENTION

According to the invention, there is provided a polyurethane foam formulation, a process for the production thereof, and a number of uses of these formulations as defined in any of the accompanying claims.

The invention more specifically provides a polyurethane foam composition comprising at least one propellant and a polyurethane prepolymer composition based on polyisocyanates which comprise, based on the weight of the polyisocyanates, at least 20 wt % methyl diphenyl diisocyanate monomer (mMDI) and at most 24.5 wt % of toluene diisocyanate monomer (mTDI), at least one towards isocyanate polyfunctional reactive compound and at least one towards isocyanate monofunctional reactive compound, the foam composition
a) containing less than 1.00 wt % of residual free methyl diphenyl diisocyanate monomer (mMDI),
b) containing at least 0.4 wt % total of methyl diphenyl diisocyanate monomers of which at least one of the two isocyanate functional groups has been reacted with a towards isocyanate monofunctional reactive compound,
c) wherein the polyurethane prepolymer composition is having an isocyanate index, expressed relative to all the towards isocyanate reactive functional groups involved in forming the polyurethane prepolymer composition, of at least 105 and at most 350,
d) wherein the equivalents ratio of the towards isocyanate monofunctional reactive compounds relative to the amount of the isocyanate functional groups initially present is at least 6.5%, and
e) wherein the equivalents ratio of towards isocyanate tri- and higher functional reactive compounds relative to the amount of the isocyanate functional groups initially present is at most 6.50%, whereby the concentrations, unless stated otherwise, are expressed relative to the total weight of the foam composition.

The inventors have found that the methyl diphenyl diisocyanate monomers of which at least one of the two isocyanate functional groups has been reacted with a towards isocyanate monofunctional reactive compound do not anymore exhibit the high reactivity of the monomer they were derived from. Their molecular weight is also higher than this of the unreacted monomer, resulting in a lower vapour pressure. The molecules are also bulkier than those of the unreacted monomers, such that they tend to migrate less. The reacted monomers therefore do not raise anymore the concerns which are associated with the unreacted diisocyanate monomers.

In U.S. Pat. No. 5,880,167, the paragraph at the bottom of column 4 where is referred to EP-A-125008, it is stated that the addition of a monofunctional compound as a further component only reduces the content of monomeric diisocyanate to a very small extent. EP-A-125008 however adds only as much monofunctional compound as equivalent to 10% of the NCO groups which remain available after the prepolymer reaction.

Also U.S. Pat. No. 4,863,994, in column 2, lines 17-20, states that monofunctional reactants particularly in polyurethane formation have been considered detrimental to resulting polymer physical properties due to their chain ending activity, and that generally speaking, their use is prohibited.

The inventors have now found, contrary to this conventional belief, that by adding more significant amounts of the towards isocyanate monofunctional reactive compound, resulting prepolymers may be obtained which are also characterized by a low methyl diphenyl diisocyanate monomer (mMDI) content, such that the prepolymers themselves, and formulations containing them, do not raise any of those concerns, do not require any of the enhanced safety measures, and may avoid the R40 safety phrase imposed on packages with compositions containing the higher amounts of methyl diphenyl diisocyanate monomers. The inventors have further found that the prepolymers containing the reacted monomers may still have sufficiently low viscosities, such that they remain suitable for dosing into the pressure can, for mixing with the other ingredients, and provide for liquid mixtures inside the pressure can which may readily be dispensed from the pressure container or vessel they are kept in.

The inventors have found that the desired low monomeric MDI content may be obtained with polyisocyanate starting materials which are rich in mMDI, and which thus do not have to be subjected to any additional mMDI physical removal steps, such as by distillation.

The inventors have further found that the desired low monomeric MDI content may be obtained while maintaining the desired prepolymer and PU foam properties without needing the high amounts of TDI or the triols as proposed in EP 2383304, and also without needing the extra dilution effects of extra blowing agents and/or high levels of flame retardants which are proposed in that same document.

The applicants have found that the limited presence of mTDI reduces the risk for having high levels of residual mTDI, a monomer which is even more volatile than the mMDI currently of regulatory concern and which therefore may represent an even higher hazard to the consumer and the environment. The limited presence of mTDI in the initial ingredients also reduces the need for, or the severity of, any intermediate process steps in the preparation of the composition with the purpose of removing residual mTDI.

The applicants have found that towards isocyanate tri- and higher functional reactive compounds may contribute to the building of the ultimately desired three-dimensional structure. The applicants have however found that adding these compounds to the composition also increases the viscosity of the composition, and that the levels required for obtaining a clear and significant effect on the ultimate foam properties typically raise the viscosity of the composition up to levels which are much higher than preferred for enabling an easy dispensing of the composition from a pressure container. The applicants therefore prefer that the level of these towards isocyanate tri- and higher functional reactive compounds in the composition is kept limited as specified, because it provides PU foam compositions which dispense readily from the pressure container. The applicants on the contrary prefer that the three dimensional structure of the PU foam is primarily built by the polyisocyanates, when these react with moisture from the surrounding air and/or substrate, a reaction which occurs after the PU foam composition has already been dispensed from the pressure container.

The inventors have found that the polyurethane foam composition according to the present invention may be formulated by starting from a suitable polyurethane prepolymer composition. In another embodiment, the invention therefore provides a polyurethane prepolymer composition based on polyisocyanates which comprise, based on the weight of the polyisocyanates, at least 20 wt % methyl diphenyl diisocyanate monomer (mMDI) and at most 24.5 wt % of toluene diisocyanate monomer (mTDI), at least one towards isocyanate polyfunctional reactive compound, and at least one towards isocyanate monofunctional reactive compound, the polyurethane prepolymer composition a) containing at most 1.40 wt % and optionally at least 0.10 wt %, of residual free methyl diphenyl diisocyanate monomer (mMDI),
b) containing at least 0.45 wt % total of methyl diphenyl diisocyanate monomers of which at least one of the two isocyanate functional groups has been reacted with a towards isocyanate monofunctional reactive compound,
c) having an isocyanate index, expressed relative to all the towards isocyanate reactive functional groups, of at least 105 and at most 350,
d) wherein the equivalents ratio of the amount of the towards isocyanate monofunctional reactive compounds relative to the amount of the isocyanate functional groups initially present is at least 6.5%,
e) wherein the equivalents ratio of towards isocyanate tri- and higher functional reactive compounds relative to the amount of the isocyanate functional groups initially present is at most 6.50%, whereby the towards isocyanate monofunctional reactive compound has a molecular weight of less than 500 and whereby the concentrations are expressed relative to the total amount or weight of the polyurethane prepolymer composition.

The inventors have found that polyurethane prepolymer compositions according to the present invention are suitable intermediates for formulating a polyurethane foam composition according to the present invention, i.e. which is sufficiently low in residual free methyl diphenyl diisocyanate monomer (mMDI) in order to avoid the obligation to carry the R40 risk phrase, and/or to dispose the empty container as dangerous and/or toxic waste. The inventors have further found that at the same time a mixture viscosity may be obtained which is suitable for the foam composition to be readily dispensed from the pressure container or vessel the liquid is kept in. The inventors have further found that with these compositions, foam may be obtained which has the desired properties of hardness, density, and elasticity which makes the products applicable in a wide range of PU foam applications. The inventors have further surprisingly found that these targets may be achieved starting from polyisocyanates which comprise, based on the weight of polyisocyanates, high amounts, such as at least 20 wt %, of methyl diphenyl diisocyanate (MDI) monomer (mMDI) and which contain low amounts of toluene diisocyanate (TDI) monomer (mTDI), such as at most 24.5 wt %. Particularly surprising was to find that with such high monomeric MDI starting material, hence not requiring any predistillation for mMDI removal, the target of the low monomeric MDI foam composition remains achievable, and this without requiring extra dilution such as by extra high amounts of flame retardants, plasticizers and/or blowing agents such as proposed in patent EP 2383304.

The inventors have further found that a higher proportion of the towards isocyanate reactive functional groups being provided by the monofunctional compounds, such as specified by the lower limit of the equivalents ratio, brings the advantage of a lower viscosity of the prepolymer composition, and thus also of the derived polyurethane foam composition. The inventors prefer to limit the presence of these monofunctional compounds however, because this avoids that the ultimate foam becomes too soft and/or too brittle. The upper limits for the involvement of these monofunctional compounds are thus inspired by a desire to obtain a foam which is stronger and/or harder and/or less brittle.

In yet another embodiment, the invention provides a method for the production of a composition according to the present invention, comprising the reaction of at least one polyisocyanate comprising methyl diphenyl diisocyanate monomer (mMDI) with at least one towards isocyanate polyfunctional reactive compound and with a towards isocyanate monofunctional reactive compound. In this reaction, the isocyanate functional groups are in stoichiometric excess to the total amount of towards isocyanate reactive functional groups present in the reactant mixture. As a result thereof, the composition remains prone to further curing under the influence of water or a hardener.

We have found that the desired low monomeric products having the correct viscosity and leading to the desired foam are obtainable by this very simple process, by simply adding sufficient amounts of towards isocyanate monofunctional reactive compound into the prepolymer preparation.

We have found that the isocyanate functional groups from the methyl diphenyl diisocyanate monomers preferentially react with the towards isocyanate monofunctional reactive compound, faster than the other free isocyanate functional groups in the mixture, such as the free isocyanate functional groups in the already polymerized molecules in the mixture. Without wanting to be bound by theory, the inventors believe that this is due to the NCO groups in the methyl diphenyl diisocyanate monomers being less sterically hindered. The result is that it are the methyl diphenyl diisocyanate monomers which preferentially react away, such that the content thereof reduces preferentially, and low methyl diphenyl diisocyanate monomer containing formulations may readily be obtained without losing too much of the free isocyanate functionality on the polymerized molecules, which are of higher interest for a good curing result.

We have also found that the selection of the towards isocyanate monofunctional reactive compound introduces an extra degree of freedom into the polyurethane formulation, such that it provides an extra control element for the properties of the prepolymer, the ultimate pressure container content, in particular the viscosity of the prepolymer and/or of the ultimate pressure container content, and/or the properties of the final polyurethane foam. The inventors have found that the present invention provides for the production of polyurethane foam pressure containers of which the content comprises less than 1% wt methyl diphenyl diisocyanate monomer (mMDI), yet which content may have a viscosity which is within the range suitable for readily being dispensed from the pressure container they are kept in. Such pressure containers may thus be exempt from the obligation to carry the R40 risk phrase, and also do not need to be disposed of as toxic waste.

We have also found that several towards isocyanate monofunctional reactive compounds are readily available at a low cost, and are readily workable, such that the introduction of this extra reactant into the production process does not necessarily add much complexity and/or costs to the production process.

In another embodiment, the invention provides the use of the polyurethane foam formulation according to the present invention as an adhesive, a mastic or a sealant, optionally for mounting doors and window frames, or for gluing construction elements together, such as bricks, stones and/or concrete.

In yet another embodiment, the invention provides the use of the polyurethane prepolymer composition according the present invention for the preparation of a polyurethane foam composition, an adhesive, a mastic or a sealant, or for gluing construction elements together, such as bricks, stones and/or concrete.

In this use, the prepolymer composition according to the present invention may possibly be used together with, such as in a mixture with, a different polyurethane prepolymer composition which is at least partly based on a polyisocyanate from which methyl diphenyl diisocyanate monomer has been removed, such as by distillation as described above.

DETAILED DESCRIPTION

In the context of this invention, the prefix "poly" is used for meaning "more than one", which when limited to integers is the same as "2 or more" or "at least 2". The term "polyol" therefore stands for a compound having at least 2 alcohol or hydroxyl (—OH) functional groups. The term "polyisocyanate" thus stands for a compound having at least 2 isocyanate (NCO or more correctly —N═C═O) functional groups.

In the context of this invention, the prefix "tri- and higher" means "3 or more" or "at least 3".

The acronym MDI is in the PU industry used for diphenyl methane diisocyanate, also called methyl diphenyl diisocyanate or methylene diphenyl diisocyanate, and this may include methyl or methylene diphenyl-4,4'-diisocyanate, also known as methane diphenyl-4,4'-diisocyanate, 1-isocyanato-4-[(4-isocyanatophenyl)methyl]benzene, 4,4'-diphenylmethane diisocyanate and 4,4'-methylene diphenyl diisocyanate, together with its 2,4' and 2,2' isomers, or may also be used for the 4,4'-MDI monomer as a single isomer, or for a blend of two of the three isomers, such as a mixture of the 4,4' and the 2,4' isomer. In the context of the present invention, the terms mMDI, monomeric MDI and MDI monomer are used in its broadest sense, covering all of these possible compositions of the methane diphenyl diisocyanate monomers.

In the context of the present invention, with crude MDI or polymeric MDI (pMDI) is meant a mixture of polyfunctional isocyanate monomers having a different number of phenyl isocyanate functions. The methyl diphenyl diisocyanate monomer with its two phenyl cores typically makes up close to half of the mixture, the rest being 3-core, 4-core, 5-core, and higher monomers, each phenyl core offering one isocyanate function. The average functionality of most commercially available crude MDI or pMDI is typically about 2.7.

In the context of the present invention, the isocyanate index for a formulation is defined as:

$$\text{Isocyanate index} = \frac{\text{Actual amount of isocyanate used}}{\text{Theoretical amount of isocyanate required}} \times 100$$

The isocyanate index is the ratio of the equivalent amount of isocyanate used relative to the theoretical equivalent amount required, which is often being expressed as a percentage and possibly even without mentioning the percentage indicator. The isocyanate index is calculated relative to the total inventory of towards isocyanate reactive functional groups present, thus including the towards isocyanate monofunctional reactive compounds as well as the towards isocyanate polyfunctional reactive compounds.

The equivalent weight of an isocyanate containing compound, mixture or sample is defined as the average weight of the compound, mixture or sample per isocyanate active site or isocyanate functional group. This may readily be calculated, even for an unknown sample, from the isocyanate (NCO) functional group content, which may for instance be analyzed by titration according to ASTM 5155 or ISO 14896, whereby the result is expressed in wt % NCO, as follows:

$$\text{equivalent weight isocyanate} = 4200/\% \text{ NCO}$$

where % NCO is the analyzed isocyanate (NCO) content expressed in wt % NCO of the sample.

For a known compound, hence with known functionality, the equivalent weight is defined as the molecular weight divided by the number of NCO functions per molecule of the compound. For mixtures of known compounds, the equivalent weight may be calculated per compound, from which if needed an equivalent weight for the mixture may be derived.

The equivalent weight of a polyol containing compound, mixture or sample is defined as the average weight of the compound, mixture or sample per reactive hydroxyl (OH) site or, for a single polyol compound, as the molecular weight of the polyol compound divided by its functionality. The equivalent weight of a polyol containing sample may readily be calculated from the analyzed hydroxyl (OH) number, as follows:

equivalent weight polyol=56100/OH number where OH number is the analyzed hydroxyl (OH) content according to method ASTM 4274 or ISO 14900 and expressed in mg KOH/g of sample.

In a recipe or formulation, the number of equivalents for each reactive compound or component may then be calculated as follows: parts by weight of the component/equivalent weight for the component.

The container according to the present invention may contain either a one component (1K) or a two component (2K) formulation, or also a so-called 1.5 component (1.5K) system.

In the case of the one-component formulations (1K, also known as one component foam (OCF)), the moisture reactive groups of the dispensed prepolymer cure almost exclusively by reaction with atmospheric moisture. This reaction is usually accompanied by cross-linking and possibly an extra increase in volume.

In case of 2-component (2K) systems, chemical curing is achieved primarily by the reaction of the in the prepolymer remaining reactive groups with the second reactive component, usually amines, water or hydroxy functional molecules. The curing reaction is in this case usually faster, such that 2K systems are more suitable for producing a higher density foam.

With so-called 1.5 component (1.5K) foams a hydroxy or an amine component, or a mixture thereof, is added to the prepolymer, shortly or immediately before being dispensed and in such an amount that at least partial conversion of all the free NCO groups is achieved. Further moisture curing may then be achieved after dispensing. This 1.5 component system brings the advantage that the curing of the applied foam is significantly faster, such that the foam may be cut or trimmed more quickly after its application, which is of convenience for the user, particularly for the professional user. A further advantage of the 1.5 component foam system is that the foam may reach a higher final density, which provides better mechanical properties, such that this foam is particularly suitable for construction purposes, and e.g. may be used for mounting window frames and doors even without needing nails, screws or bolts. Yet another advantage is that 1.5K foam shows much less expansion upon application. It is therefore easier to dose more accurately than 1K systems, and thus leads to less waste and after care. These 1.5K systems, as well as 2K systems, are also much less sensitive to low moisture substrates or environments, and are therefore more suitable than 1K systems for use in rather dry environments.

Suitable polyisocyanates for use in the present invention are aliphatic, cycloaliphatic, and aromatic polyisocyanates. Suitable products are for instance produced by BAYER, BASF/ELASTOGRAN, HUNTSMAN, YANTAI WANHUA, and others, and are offered under tradenames such as Desmodur, Lupranate, Suprasec, Wannate. Other possible candidates, however where applicable within the limits as specified, may be isophoron diisocyanate (IPDI), toluene diisocyanate (TDI), 1,5-diisocyanato naphthalene (NDI), tri-iso-cyanato trimethylmethane, 1,6-diisocyanato hexane (HDI), and 2,4- or 4,4'-di-isocyanato diphenyl methane (MDI). All these isocyanates, their isomers or derivatives (e.g. biurete and allophanate adducts) may be used as such or as a combination thereof. Preferably aromatic diisocyanates may be used, such as 4,4'-, 2,4'- and 2,2'-diphenylmethane diisocyanates, polymethylene polyphenyl isocyanates, mixtures of 4,4'-, 2,4'- and 2,2'-diphenylmethane diisocyanates and polymethylene polyphenyl isocyanates (Polymeric MDI, pMDI. The isocyanates may be modified as would be readily understood by those skilled in the field of polyurethane foam chemistry, as long as the selected isocyanates react with the polyol or polyol blend to create a final foam product which has the desired properties obtainable with the present invention.

In the present invention the polyurethane prepolymer composition is preferably based on a polyisocyanate mixture which comprises, based on the weight of the polyisocyanates, at least 20 wt % of methyl diphenyl diisocyanate monomer or monomeric MDI or mMDI. In another embodiment, these polyisocyanates comprise at least 23 wt % of the monomeric MDI, preferably at least 25 wt %, more preferably at least 27.5 wt %, even more preferably at least 30 wt %, yet more preferably at least 32.0 wt %, preferably at least 33.5 wt %, more preferably at least 34.0 wt %, even more preferably at least 35.0 wt %, yet more preferably at least 36.0 wt %, preferably at least 38.0 wt %, more preferably at least 39.0 wt %, even more preferably at least 40.0 wt % and yet more preferably at least 41.0 wt % monomeric MDI. Optionally the starting polyisocyanate mixture comprises at most 60 wt % monomeric MDI, preferably at most 55 wt %, more preferably at most 50 wt %, even more preferably at most 48.0 wt %, yet more preferably at most 46.0 wt %, preferably at most 45.0 wt %, more preferably at most 44.0 wt % and even more preferably at most 43.0 wt % monomeric MDI.

In the present invention the polyurethane prepolymer composition is preferably based on a polyisocyanate mixture which comprises, based on the weight of the polyisocyanates, at most 24 wt % of toluene diisocyanate monomer (TDI or mTDI). In another embodiment, the initial polyisocyanate mixture comprises at most 23 wt % of the monomeric TDI, preferably at most 22 wt %, more preferably at most 20 wt %, even more preferably at most 18 wt %, yet more preferably at most 16 wt %, preferably at most 15.0 wt %, more preferably at most 12.0 wt %, even more preferably at most 10.0 wt %, yet more preferably at most 8.0 wt %, preferably at most 6.0 wt %, more preferably at most 4.0 wt %, even more preferably at most 2.0 wt % and yet more preferably at most 1.00 wt % monomeric TDI. Most preferably the resulting compositions according to the present invention do not contain any measurable amount of monomeric TDI. The advantage of these compositions is that thereby also the content of mTDI in the composition may remain limited, and this without a need for an additional removal step, such that the level of concern which may be raised by the presence of this rather volatile monomer remains limited or is even avoided.

In another embodiment according to the present invention, the polyurethane prepolymer composition as well as the polyurethane prepolymer composition comprised in the polyurethane foam composition is characterized by an equivalents ratio of the towards isocyanate monofunctional reactive compounds relative to the amount of the isocyanate functional groups initially present of at least 7.0%, preferably at least 8.0%, more preferably at least 10.0%, even more preferably at least 12.0%, yet more preferably at least 13.0%, preferably at least 14.0%, more preferably at least 15.0%, even more preferably at least 16.0%, yet more preferably at least 17.0%, preferably at least 18.0%, more preferably at least 19.0%, even more preferably at least 20.0%, yet more preferably at least 21.0%. This equivalents ratio is defined as the ratio of the total functionality of towards isocyanate reactive groups contributed by the towards isocyanate monofunctional reactive compound or compounds, relative to the total isocyanate functionality contributed by all the polyisocyanates present in the starting materials. Optionally this equivalents ratio is at most 50%, preferably at most 45%, more preferably at most 40%, even more preferably at most 35%, yet more preferably at most 30%, preferably at most 25.0%, more preferably at most 24.0%, even more preferably at most 23.0%, yet more preferably at most 22.0%.

In an embodiment, the polyurethane foam formulation according to the present invention is having at least one of the following features, expressed on the same basis:
a) containing at most 0.99 wt % of residual free methyl diphenyl diisocyanate monomer (mMDI), preferably at most 0.98 wt %, more preferably at most 0.97 wt %, even more preferably at most 0.95 wt %, yet more preferably at most 0.93 wt %, preferably at most 0.90 wt %, more preferably at most 0.88 wt %, even more preferably at most 0.87 wt %, yet more preferably at most 0.86 wt %, preferably at most 0.80 wt %, more preferably at most 0.70 wt %, even more preferably at most 0.60 wt %, yet more preferably at most 0.50 wt %, and optionally at least 0.05 wt %, preferably at least 0.10 wt %, more preferably at least 0.30 wt %, even more preferably at least 0.50 wt %, yet more preferably at least 0.60 wt %, preferably at least 0.70 wt %, more preferably at least 0.80 wt %,
b) containing at least 0.5 wt % total of methyl diphenyl diisocyanate monomers of which at least one of the two isocyanate functional groups has been reacted with a towards isocyanate monofunctional reactive compound, preferably at least 1.0 wt %, more preferably at least 2.0 wt %, even more preferably at least 5.0 wt %, yet more preferably at least 7.0 wt %, preferably at least 8.0 wt %, more preferably at least 9.0 wt %, even more preferably at least 10.0 wt %, yet more preferably at least 12.0 wt %, preferably at least 15.0 wt %, more preferably at least 20 wt %, and optionally at most 62 wt %, preferably at most 60 wt %, more preferably at most 55 wt %, even more preferably at most 50 wt %, yet more preferably at most 45 wt %, preferably at most 40 wt %, more preferably at most 35 wt %, even more preferably at most 30 wt %, yet more preferably at most 25 wt %,
c) the polyurethane prepolymer composition is having an isocyanate index, expressed relative to all the towards isocyanate reactive functional groups involved in forming the polyurethane prepolymer composition, of at least 125, preferably at least 145, more preferably at least 155, even more preferably at least 160 and optionally and possibly alternatively at most 320, preferably at most 300, more preferably at most 265, even more preferably at most 250, yet more preferably at most 225, preferably at most 210, even more preferably at most 200, yet more preferably at most 185, even more preferably at most 175,
d) the equivalents ratio of the towards isocyanate monofunctional reactive compounds relative to the amount of the isocyanate functional groups initially present as stated and defined above, and
e) wherein the equivalents ratio of towards isocyanate tri- and higher functional reactive compounds relative to the amount of the isocyanate functional groups initially present is at most 6.50%, preferably at most 6.00%, more preferably at most 5.00%, yet more preferably at most 4.00%, preferably at most 3.00%.

The applicants prefer that no towards isocyanate tri- and higher functional reactive compounds are intentionally added to the compositions according to the present invention.

The inventors have found that concentrations of residual free methyl diphenyl diisocyanate monomer (mMDI) which are lower than the 1.0 wt % limit in the legal provisions are achievable and may be desirable based on the considerations of safety and industrial hygiene. The inventors however prefer to find a balance by targeting a concentration which is on the one hand sufficiently low such that, within the practical limitations when formulating the foam composition and filling the pressure containers, substantially all containers may be assured to contain as legally prescribed less than 1.00 wt % of residual free methyl diphenyl diisocyanate monomer, while on the other hand it is not excessively low such that it would unnecessarily limit the remaining degrees of freedom in formulating the composition such that preferred physical properties, including mixture viscosity, become more difficult to obtain and may require the use of extra and/or more expensive ingredients, for instance plasticizers or solvents, which would make the preparation of the foam composition more complex and/or more costly.

The inventors have found that the use of the towards isocyanate monofunctional reactive compound in the preparation of the prepolymer leads to a reduced level of residual free methyl diphenyl diisocyanate monomer because the free monomer readily reacts with the towards isocyanate monofunctional reactive compound, at least once and possibly twice, to form the corresponding derivatives. The inventors have found that these reaction products may be left in the composition and do not need to be removed. Because of their physical properties, these reaction products are not associated with any concerns similar to the free methyl diphenyl diisocyanate monomer itself. The inventors have also found that the formulation of the foam composition may be suitably adapted such that the desired physical properties of the overall mixture, in particular the viscosity thereof, may be obtained with these reaction products present. The inventors therefore prefer the polyurethane foam composition to contain a total concentration of methyl diphenyl diisocyanate monomers of which at least one of the two isocyanate functional groups has been reacted with a towards isocyanate monofunctional reactive compound as specified above.

In another embodiment, the polyurethane foam composition according to the present invention is containing a concentration of residual free isocyanate functions of at least 0.7% by weight, preferably at least 0.8% wt, more preferably at least 0.9 wt %, even more preferably at least 1.0 wt %, yet more preferably at least 1.5 wt %, preferably at least 2.0 wt %, more preferably at least 3.0 wt %, yet more preferably at least 4.0 wt %, and optionally at most 6.6% by weight, preferably at most 6.0% wt, more preferably at most 5.5 wt %, yet more preferably at most 5.0 wt %, whereby the concentration is expressed relative to the total amount or weight of the foam composition.

In yet another embodiment, the polyurethane foam composition according to the present invention further comprises, expressed on the same basis, at least one and possibly all of the following:
f) the at least one propellant or blowing agent in a total propellant concentration of at least 5% wt, preferably at least 10% wt, more preferably at least 15 wt %, even more preferably at least 20 wt %, yet more preferably at least 23 wt % and optionally and possibly alternatively at most 40% wt, preferably at most 35% wt, more preferably at most 30% wt, yet more preferably at most 28 wt %, g) at least one plasticizer and/or flame retardant in a total plasticizer and flame retardant concentration of at least 0.5 wt %, preferably at least 1.0 wt %, more preferably at least 2.0 wt %, preferably at least 4.0 wt %, more preferably at least 6.0 wt %, even more preferably at least 8.0 wt %, yet more preferably at least 10.0 wt % and optionally and possibly alternatively at most 20.0 wt %, preferably at most 17.0 wt %, more preferably at most 14.0 wt %, yet more preferably at most 12.0 wt %, h) at least one foam stabilizer and/or surfactant in a total foam stabilizer and surfactant concentration of at least 0.5 wt %, preferably at least 1.0 wt %, more preferably at least 1.5 wt %, yet more preferably at least 2.0 wt %, even more preferably at least 2.5 wt %, and optionally and possibly alternatively at most 5.0 wt %, preferably at most 4.0 wt %, more preferably at most 3.0 wt %, yet more preferably at most 2.7 wt %.

The foam composition, and optionally also the prepolymer composition, may also comprise at least one surfactant. Surfactants may provide stability to the foam's cell structure during dispensing, curing and also the post-expansion processes, which occur as a result of $CO_2$ generated by the reaction of the free isocyanate with water. A surfactant may therefore also be called and considered as being a foam stabilizer. Surfactants may further assist in the control of the open cell to closed cell ratio which, in turn, may provide dimensional stability and may affect the foaming pressure of the final cured foam. Examples of commercially available polysiloxane polyoxyalkylene surfactants, which are particularly suitable for use in the present invention, include, without limitation, those typically used in polyurethane (rigid, flexible semi-rigid) polyurethane foam applications such as those supplied by AIR PRODUCTS, GOLDSCHMIDT, SCHILL & SEILACHER, BYK CHEMIE, GE SILICONES, and others. The foam stabilizer may be selected from the group consisting of dimethicone (i.e. silicone polymer) copolyol surfactants, which may be hydroxyl and/or methoxy terminated dimethicone polyols. The surfactants may be present in the composition mixture of the present invention in an amount of 0.5 to 4.0 parts by weight, preferably 1.0 to 3.0; and more preferably about 1.0 part by weight.

The foam composition according to the present invention may also contain an amount of at least one cell opener. A cell opener brings the advantage that the foam may collapse, such as after penetrating into openings and crevices, thereby forming a thin but strong adhesive layer or membrane, and that the foam may collapse faster as compared to a foam without such cell opener. Suitable cell openers include paraffin or silicon oils, silicone-free polymers based on polyvinyl alkyl ether with a foam-inhibiting effect for example BYK-051, -052 and -053 from BYK-Chemie GmbH, silicon-containing polymers like Tegostab B-8871, Tegostab B-8934, Tegostab 8935, Niax L-6164, Struksilon 8101, Struksilon 8002, available from resp. Goldschmidt, GE Silicones, Schill & Seilacher. Mechanical cell opening may also be achieved by incorporating solids, for example talcums, calcium carbonates, and the like. Defoaming additives in low levels are also possible. The cell opening additives are typically added in quantities of 0.01 to 2, preferably 0.1 to 1 wt % (as such or as combinations thereof), based on the prepolymer composition.

The propellants or blowing agent according to the present invention are preferably selected from the group consisting of $C_1$-$C_4$ saturated hydrocarbons, preferably propane and/or butane and/or isobutane, dimethyl ether (DME), a chlorofluorocarbon or a hydrochlorofluorocarbon, preferably R152a or R134a or trans-1,3,3,3-tetrafluoropropene (also known as HFO-1234ze), and mixtures thereof.

The propellants are suitably available from a large number of suppliers. HFO-1234ze is a blowing agent obtainable from the company Honeywell.

The plasticizers are preferably selected from the group consisting of phosphates or chloroparaffines, which often exhibit at the same time also flame retardant properties, but may also be esters, preferably diesters, such as adipates, phthalates, cyclohexanoates, preferably those of alcohols having at least 4 and preferably at least 7 carbon numbers, such as of isononyl alcohol. Suitable examples of phosphates are triethyl phosphate (TEP), trichloropropyl phosphate (TCPP), and tripotassium phosphate (TKP). Suitable chlorinated paraffins are readily obtainable, such as Cereclor™ S42 and others from INEOS. Also mixtures of these compounds may be used. Plasticizers such as the diesters mentioned, e.g. diisononyl adipate, may be obtained from suppliers including BASF, Evonik or ExxonMobil Chemical. Triethyl phosphate (TEP) may be obtained from Lanxess company. Also higher molecular weight monoesters may be used, such as isononylbenzoate (INB) obtainable from Evonik. Another suitable compound may be 2,2,4-Trimethyl-1,3-Pentanediol Diisobutyrate (TXIB) obtainable from Eastman.

Suitable flame retardants may be selected from the group of halogenated, in particularly brominated, ethers from the type "Ixol" from the company Solvay, tetrabromo phthalic acid diol polyesters, such as 3,4,5,6-tetrabromo2-(2-hydroxyethoxy)ethyl-2-hydroxypropyl ester, organic phosphates, in particular diethyl-ethane phosphonate, triethyl phosphate (TEP), tetrabromo phthalate ester (available under product name DP45 from the company Great Lakes), dimethyl propyl phosphonate, diphenyl cresyl phosphate, as well as chlorinated phosphates, in particular tris-(2-chloroethyl)phosphate, tris-(2-chloroisopropyl)phosphate, tris-(1, 3-dichloro-isopropyl)-phosphate, tris-(2,3-dibromopropyl) phosphate and tetrakis-(2-chloroethyl)-ethylene diphosphate, and mixtures thereof. Preferred are those which do not have free hydroxyl groups, in order not to react with, and affect the amount of, NCO functions present.

The foam composition of the present invention may also contain one or more flame retardants. Useful flame retardants include, without limitation, any compound with flame suppression properties and which may be dissolved or dispersed in the polyurethane foam. These include compounds such as chlorinated or brominated phosphates, phosphonates, inorganic oxides and chlorides, red phosphor, expandable graphite, and the like. Preferably, the flame retardant is a soluble liquid such as triethyl phosphonate, pentabromo diphenyl oxide, and most preferably is tris(2-chloro isopropyl)phosphate (TCPP). Other suitable flame retardants may be tetrabromo bisphenol A bis(allylether), tetrabromo phthalic anhydride, a tetrabromo phthalate ester, tricresyl phosphate, tris-(2-chloro-1-(chloromethyl)ethyl) phosphate, triphenyl phosphate, and tris-(1-chloro-2-propyl) phosphate, and triethyl phosphate.

In another embodiment, the polyurethane foam composition according to the present invention is further comprising at least one additive selected from the group consisting of one or more catalysts, such as 2,2'-DiMorpholino Diethyl Ether (also called DMDEE), preferably from 0.1 to 5.0 wt %, more preferably from 0.5 to 2.0 wt %, one or more flame retardants or flame proofing agent, preferably from 5 to 20 wt %, more preferably from 10 to 15 wt %, a solvent, a viscosity depressant or viscosity reducer, a UV stabilizer, a cell opener or cell opening additive, the cell opener preferably from 0.1 to 2.0 wt %, and mixtures thereof, whereby the concentrations are expressed relative to the total foam composition.

Other suitable catalysts comprise all known compounds which may catalyse isocyanate reactions. Examples are titanates, such as tetrabutyl titanate or tetrapropyl titanate of tetraisopropyl titanate, and mixtures thereof. Other examples are tin carboxylates, such as dibutyl tin dilaurate (DBTL), dibutyl tin diacetate, tin octanoate, tin oxide such as dibutyl tin oxide and dioctyl tin oxide, organoaluminum compounds such as aluminum tris acetyl acetonate, aluminum tris ethyl aceto acetate, chelate compounds such as titanium tetra acetyl acetonate, amine compounds such as triethylene diamine, guanidine, diphenyl guanidine, 2,4,6-tris(dimethyl amino methyl)phenol, morpholine, N-methyl morpholine, 2-ethyl-4-methyl imidazole, N,N-dimethyl piperazine, 1,8 diazabicyclo[5.4.0]undec-7-ene, dimorpholino dimethyl ether, dimorpholino diethyl ether (DMDEE). Also mixtures of these compounds may be used, and may be preferred. The concentration thereof may be in the range of 0.01 to 5 wt % of the total composition.

The foam composition according to the present invention preferably further comprises a catalyst, such as an amine catalyst, to accelerate the reaction of the compounds in the mixture containing reactive hydrogen atoms and isocyanate groups in the phase of prepolymer formation, and to accelerate the moisture curing reaction after the reaction mixture is extruded. The amine catalyst may comprise a primary, secondary or tertiary amine, with tertiary amine catalysts being particularly preferred. Examples of suitable catalysts are dimethyl ethanol amine (DMEA), tetramethyl imino bispropyl amine (available as Polycat® 15 from the company Air Products), N,N-dimethyl cyclohexyl amine (DM-CHA), tetraethylene diamine (Dabco/TEDA), organometallic compounds such as tin mercaptide, dibutyltin dilaurate (DBTDL), and the like. Most preferably, the amine catalyst is a dimorpholine compound such as dimorpholino polyethylene glycol (PC Cat® 1 KSC available from the company Nitroil), 2,2'-dimorpholino diethyl ether (DMDEE), with 2,2'-dimorpholino diethyl ether being particularly preferred.

In another embodiment, the invention provides a pressure container containing the polyurethane foam composition according to any one of the preceding claims. Such pressure container provides an easy assurance that the foam composition does not prematurely come in contact with moisture and would start curing prematurely. The pressure container is also very convenient for applying the PU foam composition. This may happen with a handheld method, such as the method described in WO 2012/052449 A2. Alternatively, the foam composition may be applied by a method employing a dispenser gun, such as the method described in WO 2011/151295 A1, preferably the method described in WO 2011/151296 A2.

In an embodiment, the polyurethane prepolymer composition according to the present invention is having at least one and possibly all of the following features:
a) containing at most 1.38 wt % of residual free methyl diphenyl diisocyanate monomer, preferably at most 1.35 wt %, more preferably at most 1.30 wt %, even more preferably at most 1.20 wt %, preferably at most 1.10 wt %, more preferably at most 1.05 wt %, even more preferably at most 1.00 wt %, yet more preferably at most 0.99 wt % of residual free methyl diphenyl diisocyanate monomer, preferably at most 0.98 wt %, more preferably at most 0.97 wt %, even more preferably at most 0.95 wt %, yet more preferably at most 0.93 wt %, preferably at most 0.90 wt %, more preferably at most 0.88 wt %, even more preferably at most 0.87 wt %, yet more preferably at most 0.86 wt %, preferably at most 0.80 wt %, more preferably at most 0.70 wt %, even more preferably at most 0.60 wt %, yet more preferably at most 0.50 wt %, and optionally at least 0.20 wt %, preferably at least 0.50 wt %, more preferably at least 0.75 wt %, even more preferably at least 1.0 wt %, yet more preferably at least 1.20 wt % and preferably at least 1.25 wt %,
b) containing at least 0.5 wt % total of methyl diphenyl diisocyanate monomers of which at least one of the two isocyanate functional groups has been reacted with a towards isocyanate monofunctional reactive compound, preferably at least 1.5 wt %, more preferably at least 3.0 wt %, even more preferably at least 7.0 wt %, yet more preferably at least 10.0 wt %, preferably at least 12.0 wt %, more preferably at least 15.0 wt %, even more preferably at least 20.0 wt %, and optionally at most 77.0 wt %, preferably at most 70 wt %, more preferably at most 65 wt %, even more preferably at most 60 wt %, yet more preferably at most 55 wt %, preferably at most 45 wt %, more preferably at most 40 wt %, even more preferably at most 35 wt %, yet more preferably at most 30 wt %, preferably at most 25 wt %, and
c) wherein the polyurethane prepolymer composition is having an isocyanate index, expressed relative to all the towards isocyanate reactive functional groups, of at least 125, preferably at least 145, more preferably at least 155, even more preferably at least 160 and optionally and possibly alternatively at most 320, preferably at most 300, more preferably at most 265, even more preferably at most 250, yet more preferably at most 225, preferably at most 210, even more preferably at most 200, yet more preferably at most 185, even more preferably at most 175, and
d) the equivalents ratio of the amount of towards isocyanate monofunctional reactive compounds relative to the amount of the isocyanate functional groups initially present being at least 7.0%, preferably at least 8.0%, more preferably at least 10.0%, even more preferably at least 12.0%, yet more preferably at least 13.0%, preferably at least 14.0%, more preferably at least 15.0%, even more preferably at least 16.0%, yet more preferably at least 17.0%, preferably at least 18.0%, more preferably at least 19.0%, even more preferably at least 20.0%, yet more preferably at least 21.0%, and optionally and possibly alternatively at most 50%, preferably at most 45%, more preferably at most 40%, even more preferably at most 35%, yet more preferably at most 30%, preferably at most 25.0%, more preferably at most 24.0%, even more preferably at most 23.0%, yet more preferably at most 22.0%, whereby the equivalents ratio is defined as the ratio of the total functionality of towards isocyanate groups contributed by the towards isocyanate monofunctional reactive compound or compounds, relative to the total isocyanate functionality contributed by all the polyisocyanates present in the starting materials, and
e) the equivalents ratio of towards isocyanate tri- and higher functional reactive compounds relative to the amount of the isocyanate functional groups initially present is at most 6.50%, preferably at most 6.00%, more preferably at most 5.00%, yet more preferably at most 4.00%, preferably at most 3.00%.

The inventors prefer that the polyurethane prepolymer composition is having a lower concentration of residual free methyl diphenyl diisocyanate monomer, because it brings the advantage that, in formulating the ultimate polyurethane foam composition, the target of a low residual free methyl diphenyl monomer concentration is more readily achievable, and it leaves more freedom in dosing the other ingredients of the composition such that also the other desired properties, in particular mixture viscosity, may be more readily achieved, with a less complex mixture and a lower cost.

The inventors have found that the target low concentrations of free methyl diphenyl diisocyanate monomer are achievable within the specified ranges of isocyanate index, provided that the amount of towards isocyanate monofunctional reactive compounds and the amount of towards isocyanate polyfunctional reactive compounds which are used together with the isocyanate polyfunctional compounds in preparing the compositions are properly adapted to each other. These amounts however depend on the selection of the different raw materials, and can therefore not be specified independently. The person skilled in the art however will find it easy to determine, once the raw materials are selected, which relative amounts may be used in order to achieve the desired balance of composition and properties.

We have found that the properties which are the targets of the present invention are particularly conveniently and readily achievable with the equivalents ratio as defined above being within the specified ranges.

In another embodiment, the polyurethane prepolymer composition according to the present invention is containing a concentration of residual free isocyanate functions of at least 1.0% wt, preferably at least 1.2% by weight, more preferably at least 1.5 wt %, even more preferably at least 2.0 wt %, yet more preferably at least 3.0 wt %, preferably at least 4.0 wt %, more preferably at least 5.0 wt %, yet more preferably at least 6.0 wt %, and optionally at most 8.75% wt, preferably at most 8.50% by weight, more preferably at most 8.0% by weight, even more preferably at most 7.5% wt, yet more preferably at most 7.0 wt %, yet more preferably at most 6.5 wt %, the concentration based on the total amount or weight of the polyurethane prepolymer composition. This concentration may be readily determined by the well known titration methods described in ASTM D5155 or ISO 14896. The titration result is conventionally converted to a weight concentration using the weight of 42 for the NCO function or functional group.

In an embodiment of the composition according to the present invention, which may be the polyurethane foam composition or the polyurethane prepolymer composition, the towards isocyanate monofunctional reactive compound is selected from the group consisting of all nucleophiles, including an alcohol, preferably a primary alcohol, a secondary amine, a thiol, an acid, and mixtures thereof. The inventors prefer to use a monofunctional alcohol compound as the towards isocyanate monofunctional reactive compound according to the present invention.

In another embodiment of the composition according to the present invention, which may be the polyurethane foam composition or the polyurethane prepolymer composition, the towards isocyanate monofunctional reactive compound is selected from the group consisting of a saturated alkyl alcohol, an aryl alcohol, an alkylaryl alcohol, the primary, secondary and tertiary variants thereof, preferably the primary or the secondary and more preferably the primary variant thereof, a polyol of which all except one alcohol functional group has been etherified with a monofunctional alcohol or esterified with a monobasic acid, the alkoxylated derivatives thereof, and mixtures of at least two of any of the listed compounds.

In yet another embodiment of the composition according to the present invention, which may be the polyurethane foam composition or the polyurethane prepolymer composition, the towards isocyanate monofunctional reactive compound is selected from the group consisting of the C1-C36 aliphatic primary alcohols, linear (i.e. straight chain) and branched, preferably at least C2, more preferably at least C3, even more preferably at least C4, yet more preferably at least C5, preferably at least C6 or C7, more preferably at least C8, amongst the C8 alcohols 2-ethyl hexanol being even more preferred, and optionally at most C24, preferably at most C22 or C20, more preferably at most O18, amongst the O18 stearic alcohol being even more preferred, yet more preferably at most C14, amongst which mixtures of C12 and C14 linear alcohols are the more preferred, and mixtures thereof.

Any mixtures of towards isocyanate monofunctional reactive compounds may be mixtures of molecules having linear structures, also known as straight chain structures, and/or of molecules having branched structures. When mixtures are used of towards isocyanate monofunctional reactive compounds having different carbon numbers, the inventors prefer that the weight average carbon number of the compounds is comprised within the specified ranges.

The applicants have found that the higher the carbon number and/or the molecular weight of the towards isocyanate monofunctional reactive compound, and in particular of the alcohol, the softer the ultimate foam becomes. Without wanting to be bound by theory, the applicants believe that when the monofunctional compound introduces too much of an inert molecular fraction, that this fraction of the compound starts to act as a diluent in the formulation, which may have a viscosity effect, and also as an internal plasticizer for the foam. While this may be preferred in some instances, the applicants prefer for a more general purpose use to select a monofunctional compound, especially an alcohol, within the more preferred ranges as specified elsewhere in this document, in order to achieve the best balance of properties. The applicants therefore prefer for this reason to select an alcohol having at most 18 carbon atoms. The applicants have found that for instance 2-ethyl hexanol provides a very suitable balance between on the one hand the properties of the prepolymer composition and the foam composition, and on the other hand the properties of the ultimate foam itself. This particular C8 alcohol is readily obtainable in abundance from a number of commercial suppliers and is therefore one of the more economical compounds for use in the present invention. The applicants believe that close homologs to 2-ethyl hexanol may provide similarly a very suitable balance of properties.

In again another embodiment of the composition according to the present invention, which may be the polyurethane foam composition or the polyurethane prepolymer composition, the towards isocyanate monofunctional reactive compound has a molecular weight of at least 32, preferably at least 36, more preferably at least 48 or 56, even more preferably at least 72 or 80, more preferably at least 90, even more preferably at least 100, yet more preferably at least 120 and optionally at most 480, preferably at most 450, more preferably at most 400 or 350, even more preferably at most 300 or 250, and yet more preferably at most 200.

In yet another embodiment of the composition according to the present invention, which may be the polyurethane foam composition or the polyurethane prepolymer composition, the polyurethane prepolymer composition is further based on at least one polyisocyanate monomer selected from the group consisting of 3-core, 4-core, 5-core phenyl isocyanate monomers, and mixtures thereof, preferably the polyurethane prepolymer composition being based on crude methyl diphenyl diisocyanate (crude MDI) or polymeric (pMDI).

The selection of crude MDI or pMDI brings the advantage that this raw material is more readily available at a more acceptable cost, such that it brings an economic advantage. It is also the raw material which is most common in the PU industry, such that the implementation of the present invention brings the least changes to an already existing and conventional production facility. The other advantage, as compared to pure MDI monomer as a starting material, is that in the starting material the pure monomeric MDI is already diluted, which makes the target of achieving the desired low concentrations of residual free methyl diphenyl diisocyanate monomer more readily achievable.

In another embodiment of the composition according to the present invention, which may be the polyurethane foam composition or the polyurethane prepolymer composition, the remaining functionality of the prepolymer, calculated based on the isocyanate monomer after reaction thereof with only all of the towards isocyanate reactive monofunctional compounds, is at least 1.60, preferably at least 1.90, more preferably at least 2.00, even more preferably at least 2.02, and optionally at most at most 2.50, preferably at most 2.40, more preferably at most 2.30, even more preferably at most 2.20, preferably at most 2.10, more preferably at most 2.05, even more preferably at most 2.04, yet more preferably at most 2.03.

The inventors have found, when the remaining isocyanate functionality of the mixture, after reaction with the chain terminating monofunctional compound, is in this range, that the step growth polymerization reaction of the polyisocyanate compounds with the towards isocyanate polyfunctional reactive compounds may still readily proceed and may lead to a stable foam composition as well as to a suitable ultimate foam.

In an embodiment of the method according to the present invention, the towards isocyanate monofunctional reactive compound is selected from a monofunctional alcohol and a mixture of monofunctional alcohols.

In another embodiment of the method according to the present invention, the towards isocyanate polyfunctional reactive compound is selected from a polyol and a polyol mixture. The inventors prefer to use polyether polyols, usually made by the reaction of epoxides (oxiranes) with a starter compound having an active hydrogen atom. Suitable examples thereof are for instance P400 diol obtainable under the tradename Voranol P400 or other diols like Voranol P1010 or Voranol P2000, all available from the Dow Company. Also suitable are polyester polyols, usually made from the polycondensation (i.e. polyesterification) of multifunctional carboxylic acids with multifunctional hydroxyl compounds. Suitable examples are the Isoexter® type products available from the company COIM, the Polios® type products available from the company Purinova, the Stepanpol® type products available from Stepan Company, and the Hoopol® type products available from the company Synthesia.

Suitable polyols for use in the present invention are polyether or polyester polyols known for the production of polyurethane elastomeric adhesives and sealants, rigid, semi-rigid, flexible and froth foams. The polyether/polyester polyols may also contain amine groups. The polyol preferably has an average molecular weight of 400 to 4500 and a functionality, which means an average functionality in case of mixtures, most conveniently a weight average but alternatively a molar average, of from 2 to 4, preferably from 2 to 3. Preferably the foam and/or prepolymer composition of this invention contains one single polyol, although a mixture of two or more different polyols may be used as well.

In an embodiment of the present invention, the equivalents ratio of towards isocyanate difunctional reactive compounds having a molecular weight of at most 100 g/mole, relative to the amount of the isocyanate functional groups, is at most 19.0%. The applicants prefer that the group of these low molecular weight towards isocyanate difunctional reactive compounds extends to compounds having a molecular weight of at most 110, preferably at most 120, more preferably at most 150, even more preferably at most 175, yet more preferably at most 200, and preferably at most 250. The applicants prefer that the group of these low molecular weight towards isocyanate difunctional reactive compounds are present in concentrations of at most 18.0 wt %, preferably at most 17.0 wt %, more preferably at most 15.0 wt %, even more preferably at most 12.5 wt %, yet more preferably at most 10.0 wt %, preferably at most 5.0 wt %. The applicants prefer that the compositions according to the present inventions do not contain any significant amount of such lower molecular weight difunctional compounds. The applicants have found that these compounds may bring too fast reaction rates, excessive heat generation, and may affect the properties of the foam formulation and of the ultimate foam unfavourably.

In an embodiment of the present invention, the method comprises in a first reaction step the condensation reaction of the at least one polyisocyanate with the towards isocyanate polyfunctional reactive compound, the product of the first reaction step being further reacted in a second reaction step with the towards isocyanate monofunctional reactive compound to form the polyurethane prepolymer composition.

In another embodiment of the present invention, the method comprises as the first reaction step the reaction of the polyisocyanate with less than a stoichiometric amount of the towards isocyanate monofunctional reactive compound, followed by as the second reaction step the reaction of the product of the first reaction step with the towards isocyanate polyfunctional reactive compound to form the polyurethane prepolymer composition.

In another embodiment of the present invention, the method comprises that the reaction of the polyisocyanate with the towards isocyanate monofunctional reactive compound and the reaction of the polyisocyanate with the towards isocyanate polyfunctional reactive compound occur at least partially simultaneously. The applicants prefer that the two reactions occur simultaneously in the same reacting mixture.

In yet another embodiment of the method according to the present invention, the reaction with the towards isocyanate monofunctional reactive compound is performed in a pressure container or can or vessel wherein the reactants have been introduced, optionally together with at least one of the additional components selected from a propellant or blowing agent, a plasticizer, a foam stabilizer, a catalyst, a flame retardant, a solvent, a viscosity depressant or viscosity reducer, a UV stabilizer, a cell opener, and mixtures thereof. The applicants have found that this embodiment provides a very simple single step method for the production of the composition according to the present invention.

In yet another embodiment of the method according to the present invention, the polyurethane prepolymer composition is further based on at least one polyisocyanate monomer selected from the group consisting of 3-core, 4-core, 5-core phenyl isocyanate monomers, and mixtures thereof, preferably the polyurethane prepolymer composition being based on crude methyl diphenyl diisocyanate (crude MDI) or polymeric (pMDI). The applicants find suitable products readily obtainable under the tradename Desmodur from the company Bayer.

In yet another embodiment of the method according to the present invention, the method comprises the step of the production of a polyurethane prepolymer composition using the method according to the present invention and further comprises the step of incorporating the propellant and optionally at least one and preferably all of the further ingredients selected from the plasticizer, the foam stabilizer, and the further additives listed as part of the present invention. The applicants prefer to achieve a PU foam composition excluding the propellants and/or blowing agents which has a viscosity as determined at 50° C. according to ASTM D2196 in the range of 2000 to 150000 mPa·s, preferably in the range 5000 to 80000 mPa·s, more preferably in the range of 10000 to 60000 mPa·s, even more preferably in the range of 15000 to 50000 mPa·s, and yet more preferably in the range of 20000 to 40000 mPa·s.

Analyticals

Determination of mMDI Concentration

The applicants have found that different analytical methods may result in significantly different results for the same sample. The applicants prefer to determine the content of monomeric MDI (mMDI) and other associated components in polyurethane prepolymer compositions and in polyurethane foam compositions as explained in what follows, using Gel Permeation Chromatography (GPC), because this method was found to provide more accurate, reliable and more conservative results, the latter being preferred in view of possible liability concerns which could be caused by a too optimistic analytical method.

The applicants prefer to use as GPC apparatus the GPC/SEC apparatus which is part of the Agilent 1200 Infinity Series LC, equipped with its 1200 Series isocratic pump, standard auto sampler for volumes between 0.1 and 100 microliter. We prefer to use the SECcurity GPC column oven TCC6000, the 1200 Series Variable Wavelength UV detector, SECcurity 2 channel online degasser for degassing the eluent, and the WinGPC Unity Software for peak integration. For the separation, we prefer to use the GPC analytical column set consisting of the following columns in series, which was found to improve the separation of molecules having rather low molecular weights: 2×GPC columns PSS SDV analytical, 3 µm, 100 Å, 300×8.0 mm followed by 2×GPC columns PSS SDV analytical, 3 µm, 1000 Å, 300×8.0 mm. In addition, a so called pre-column or guard-column, 3 µm, 50×8.0 mm, may be used as first column in order to protect the four analytical columns. The applicant has found that a second column with the same pore size may increase the resolution, and with a different pore size may increase the separation range. It is clear to the person skilled in the art that the number, nature and characteristics of the columns usually affect the chromatogram, and that for instance elution times will need to be adapted to the particular GPC column setup.

The pump is preferably set for a flow of 1.000 (one) ml/minute, with tetrahydrofuran (THF) as the eluent. The UV detector is preferably set for a 254 nm wavelength. Further preferred settings include an injection volume of 25 microliter, a column temperature of 30° C., a sample concentration of approximately 4 microgram/microliter. A typical analysis takes about 50 minutes of time. Prior to injecting the first sample of each new run, we prefer to allow the chromatographic system to equilibrate by pumping eluent through the columns for at least 50 minutes until a stable baseline is observed.

When the sample contains propellants it is advised to first prepare a degassed sample as follows. At least 100 grams of the homogenized contents of for instance a polyurethane foam composition from a pressure container is emptied in a closable polyethylene (PE) container which is placed in an oven at 50° C. At regular intervals, the PE container is vigorously shaken and opened, allowing the propellants to escape. This step is repeated until the sample is completely degassed. Important during these steps is to avoid that atmospheric moisture enters the PE container and causes a reaction with isocyanate (sample curing). From the mass balance, the amount of propellant present in the original sample may be calculated.

The degassed sample, or a sample of a polyurethane prepolymer composition, is further prepared as follows: Approximately 40 mg of the sample to be analyzed is weighed into a closable sample tube and 10.00 ml of a sample diluent is added. We prefer to use as sample diluent a mixture of tetrahydrofurane (THF) further containing toluene at a concentration of 3 grams/liter. We prefer to use tetrahydrofuran (THF), 99.9%, extra pure, anhydrous, stabilized with butylhydroxytoluene (BHT) obtained from Acros, and Toluene, 99.85%, Extra Dried over Molecular Sieve also obtained from Acros. The toluene serves as an internal flow marker.

The total sample weight is then recorded to the nearest 0.1 milligrams. The applicants have found that for the given sample concentration, conditions and settings, the mMDI concentration may readily be determined in the range from 0.1 to 20 wt % with an accuracy of better than 0.1% absolute, even at the low levels, and even better than 0.05% absolute at the important level of about 1.00% wt % mMDI. The applicants have found that these quantitative criteria are applicable for the pure 4,4'-MDI isomer, but may be different for the other isomers. At higher concentrations, such as above 20 wt %, the applicants have found that the sample may readily be sufficiently diluted, and/or a lower injection volume may be used, compared to the standard concentration of 4 mg/ml in an injection volume of 25 µl, in order to avoid that the UV detector signal would go off scale, such that a meaningful result may be obtained.

The sample is preferably given at least 30 minutes for the sample to completely dissolve in the sample diluent. It is subsequently filtered over a 25 mm polytetrafluoroethylene (PTFE) filter with a 0.2 micrometer pore size, in order to remove any non-soluble material which may foul or block the GPC apparatus. During this sample preparation, contact with water or with atmospheric moisture should be avoided as much as possible, as it may influence the outcome of the measurement.

The sample is then injected into the apparatus, the UV detector response is recorded and the MDI concentration may be determined by peak integration.

The applicants have found that this analytical method may be calibrated, such as by using analytical standards, to provide reliable quantitative results. By calibration is meant here that the detector response, which may be signal intensity or peak area, may quantitatively be linked to a concentration or an amount of a particular substance or combination thereof. The applicants have used for the calibration standard a fresh high purity mMDI source, preferably the product obtainable as 'Lupranat ME' from BASF. This product is at least 98% pure in the 4,4'-MDI isomer. Similar suitable products are available as Desmodur 44M from Bayer, or Isonate M 124 or M 125 from Dow, or Suprasec 1000 or 1100 from Huntsman.

The applicants have found that the different methyl diphenyl diisocyanate (mMDI) isomers, i.e. 4,4'-MDI, 2,4'-MDI and 2,2'-MDI, cannot be readily separated from each other by means of the GPC analytical technique. For example, on a GPC system where pure 4,4'-MDI elutes at an elution volume of 40.66 ml, pure 2,4'-MDI was found to elute at an elution volume of 40.96 ml. Mixtures of 4,4'- and 2,4'-MDI, having mass concentrations of up to 50 wt % 2,4'-MDI, all eluted approximately at the same elution volume as the pure 4,4' MDI on the same system. Increasing the wt % of 2,4' MDI in the mixture further from 50 to 100%, made the elution volume increase from 40.66 to 40.96 ml.

In case the different mMDI isomers would have the same response factor (V*ml/µg) towards the UV detector, at the specified wavelength of 254 nm, this analytical method would be able to provide as result the total concentration for the total of all the mMDI isomers together. However, the applicants have found that the two most important isomers 4,4'-MDI and 2,4'-MDI have significantly different response factors towards the UV detector at the specified wavelength, such that the individual concentrations of these isomers need to be determined in order to obtain an accurate result for the total. The third isomer 2,2'-MDI has not been investigated because the relative amount of this isomer in polyurethane samples which are based on mMDI is generally very low (<3% relative to the total mMDI), meaning that the presence of this isomer would have no significant effect on the correct value for the response factor used for the total amount of MDI to be reported. For samples where this isomer is expected to be of higher importance, it is recommended that also the individual response factor of 2,2'-MDI is determined, and accounted for, such that a more accurate result for the total mMDI content may be obtained.

A suitable calibration method was developed for the determination of the total amount of MDI. The procedure is considered suitable for mixtures in which the 2,2'-MDI concentration is considered too low to have any significant impact on the total. When the 2,2'-MDI may be neglected, a sufficiently accurate value for the total amount of mMDI may be obtained if the ratio of the isomers 4,4'- and 2,4'-MDI present in the sample can be determined. For this purpose, the calibration should be performed with two sets of samples (1) and (2), in which:

(1) The samples contain only 4,4'-MDI (or only 2,4'-MDI) as mMDI (2) The samples contain both 4,4'- and 2,4'-MDI as mMDI It is important that the presence and quantities of the isomers 4,4'- and 2,4'-MDI in the two sets of calibration samples are accurately determined with a suitable method, using extra information about the relative isomer ratios of the mMDI which may be determined fairly accurately with methods such as DIN ISO 10283, but which may be less appropriate for determining absolute concentrations in view of possible side reactions occurring during the analytical method.

For the calibration, the applicants preferred to run a series of at least seven solutions of pure 4,4'-MDI as the only mMDI in THF, in the concentration range from 1.000 to 0.001 microgram/microliter. The applicants have found that when columns are used with a high number of "theoretical plates", hence a better separation, that the upper limit of this concentration range may be reduced, such as to 0.750 mg/ml for the 4,4'-MDI isomer when using a number of theoretical plates of at least 25,000. For the 2,4'-MDI isomer the applicants prefer to use with the same installation a somewhat higher concentration, such as about 2 mg/ml. The calibration samples were injected separately. Pure 4,4'-MDI as the mMDI eluted approximately at 39.9 ml elution volume, which became 40.6 ml elution volume when a pre-column was used, and for each calibration sample the peak area for the mMDI peak could be integrated. A calibration curve was then constructed by plotting the peak area relative to the amount of mMDI which was injected. The applicants have found that this curve is substantially linear. The curve slope may thus provide a suitable response factor between the GPC reading and the concentration of the monomeric MDI, in this case pure 4,4'-MDI.

The same procedure was followed once more, now for pure 2,4'-MDI as the only mMDI. In this case, pure 2,4'-MDI as the mMDI eluted approximately at 40.2 ml elution volume, which became 40.9 ml elution volume when a pre-column was used.

The applicants found on their system only 0.0078 V*ml/µg for the response factor of pure 2,4'-MDI, but as high as 0.0178 V*ml/µg for the response factor of pure 4,4'-MDI. This big difference illustrates that significant errors may be made if both isomers are present in significant amounts and no correction for the difference in response factors would be made.

The applicants have found, once the response factors of individual isomers have been determined, and the relative importance of the individual isomers have been determined by another method, that the average response factor for the mixture, in the present method, may be calculated from the available data. This accuracy of this averaging method may be experimentally verified by measuring the response factor for mixtures, as explained below.

For the calibration in case of mixtures, i.e. in which the amount of 2,4' MDI has to be taken into account in order to obtain an accurate result, the applicants preferred to run a series of at least 10 solutions of mMDI in THF, more specifically, 100% pure 4,4'-MDI isomer on the one hand and 100% pure 2,4'-MDI isomer on the other hand, and at least 8 mixtures conveniently chosen in between, in this case 90/10, 80/20, 70/30, 60/40, 50/50, 40/60, 30/70, 20/80 and 10/90 wt %/wt %, all at a single concentration of not higher than 1.000 microgram/microliter, or the maximum suitable for the specific separation column. For each calibration sample, the response factor was then calculated from the mMDI peak area and the known concentrations and/or amounts of the sum of the mMDI isomers. A calibration curve was then constructed by plotting the response factor relative to the % of 2,4'-MDI in the calibration samples. The applicants found that the resulting curve is substantially linear ($R^2$=0.9962) and that the intercept at 0% of 2,4'-MDI corresponds correctly with the response factor which was determined on that system for the pure (i.e. substantially a full 100%) 4,4'-MDI alone (see above).

When the relative ratios of the presence of the isomers 4,4'- and 2,4'-MDI (and 2,2'-MDI), relative to the total of all the mMDI present, in the unknown sample, have been accurately determined with a suitable method, e.g., DIN ISO 10283, the corrected value of the response factor for the mixture in the specified GPC method may be calculated, or with only accounting for the two main isomers read from the calibration curve as obtained above, at the ratio of 2,4-MDI as part of the total of 2,4'-MDI and 4,4'-MDI. Using this response factor for the mixture, from the GPC result the concentration of the total monomeric MDI in the sample may then be calculated accurately. In the simplified case the result is assumed to be the sum of only 2 isomers 4,4'- and 2,4'-MDI, or in other words, the 2,2'-MDI is assumed to have the same response factor as the mixture of 4,4'- and 2,4'-MDI at hand; and in the more complex case where the 2,2'-MDI represents at least 5% relative as part of total mMDI and correction therefore is recommended, the result is accounting for the three individual isomers.

Using the recorded sample weight and the amount of removed propellant gasses, the concentration in the starting sample, with or without the propellant gasses, may be determined. The applicants have found that the result may be reported down to an accuracy of 5% relative to the measured value.

Determination of TDI Concentration

The method for mMDI determination may also be used for the determination of the monomer TDI. Obviously in this case a new calibration curve, specific for TDI, has to be determined.

Calibration of the GPC Method for Molecular Weight

It is known to the skilled person that the primary information obtained from the GPC UV detector is not the molar mass, but the apparent concentration at a certain elution volume. When one is interested in determining molecular weight distributions, calibration of the GPC for molar mass is required, which is based on assigning the elution volume to a certain molar mass. The most common method for this calibration, which is preferred by the applicant, is the method that uses molar mass standards with a narrow molecular weight distribution, e.g. polystyrene standards such as the 'ReadyCal PS' series, available from the company PSS in Germany. The elution volumes of the molar mass standards are then measured and plotted against the logarithm of the molar mass at the peak maximum of each analytical standard. A proper fit function which appropriately describes the shape of the calibration curve has also to be chosen. Using this fit function, the molecular weight distribution (relative to polystyrene) and their respective molecular weight averages, i.e., $M_n$ and $M_w$, may then be calculated. It should be noted that most accurate results may be obtained for chemically and structurally identical substances compared to polystyrene. As an example, for monomeric MDI the weight average molecular weight $M_w$ as determined with such calibrated method was found to be in the range of 217-222 Dalton. This result then becomes independent on whether a pre-column is used or not.

Such calibration for molecular weight may be very helpful in determining the molecular weight of the towards isocyanate monofunctional reactive compound, and of the two reaction products thereof with the mMDI, and may thus provide information of the identity of these compounds. The applicants have found that this is very convenient when the towards isocyanate monofunctional reactive compound is a monofunctional alcohol, which may more simply also be called a monol.

Identity of the Monofunctional Compound

The nature of the monofunctional compound may be determined by means of FTIR.

The reaction product of monomeric MDI with once the towards isocyanate monofunctional reactive compound may for sake of simplicity here also be called the mono-reacted compound, and the product twice reacted by analogy the dual-reacted compound. The dual-reacted compound is actually a non-reactive compound in the formulation of the prepolymer or foam composition according to the present invention. The molecular weight of the monofunctional compound may thus be determined by means of GPC in case a molecular weight calibration curve is known, as explained elsewhere in this document. In case the mixture has not yet cured, both peaks of the mono-reacted and dual-reacted compounds were found to show a typical finger print in the molecular weight distribution (MWD) plot, which obviously depends on the molecular weight of the monofunctional compound used. For example, for methanol as monofunctional compound, the molecular weight peaks for the mono- and dual-reacted compound were found at a weight average molecular weight of approximately 330 and 442 Dalton, respectively. However, if necessary in order to clearly elucidate the identity of the monofunctional compound, more in depth analysis may be required by means of LCMS, GCMS, NMR or other common methods known by the person skilled in the art.

Monomeric MDI Reaction Products with the Towards Isocyanate Monofunctional Reactive Compound.

The applicants have found that the same technique as described above for the determination of the monomeric MDI content of a composition, may be used for determining the content of the reaction product of monomeric MDI with twice the towards isocyanate monofunctional reactive compound. The applicants have found that, once the identity of the towards isocyanate monofunctional reactive compound has been determined or is known, that this reaction product may be synthesized, and that the location of the peak thereof in the GPC elution chromatogram (elugram), as well as its response factor for quantitative determination, may be determined. The applicants have found that the intermediate reaction product, whereby the monomeric MDI is only reacted once with the towards isocyanate monofunctional reactive compound, is more difficult to analyze for. By using a stoichiometric excess of mMDI in the synthesis reaction of the twice reacted model compound, and by injecting this into the GPC method described, at least the location of the GPC peak of the mono-reacted compound may be determined. As the response factor for pure monomeric MDI may thus be known, and the response factor may be determined for the dual-reacted compound, the response factor of the mono-reacted compound may also be determined by applying a simple mass balance on appropriately prepared samples containing mixtures of these compounds.

Miscellaneous Other Analytical Methods

Viscosity is preferably determined according to ASTM D2196 or DIN 53018.

Residual free isocyanate functionality or NCO group content is preferably determined using a titration method similar to that of ASTM D5155 or ISO 14896, or equivalent.

The concentration of propellant or blowing agent in a PU foam composition may readily be determined by using the relevant part of the sample preparation in the GPC method described above.

The presence of other components in the composition may readily be determined by Fourier Transform Infra Red spectroscopy (FTIR), by gas chromatography (GC) or high performance liquid chromatography (HPLC), the latter two optionally combined with mass spectrometry (MS) methods, i.e. methods which are conventional and known by the person skilled in the art.

Examples

A polyurethane prepolymer composition was prepared by introducing the ingredients which are listed in Table 1 down to and including the catalyst, into a pressure container which was subsequently closed off with a container valve, and then pressurized with blowing agents, shaken and allowed to react during at least 72 hours. The applicants have found that when this preparation was performed without adding the blowing agents, the composition obtained looked identical in all analytical tests to this of the preparation with the blowing agents, from which the blowing agents were removed before analysis.

TABLE 1

| TYPE | NAME | WEIGHT % |
|---|---|---|
| Isocyanate (pMDI) | Suprasec 5025 | 31.39 |
| Monofunctional alcohol (OH) | 2-ethyl-hexanol | 8.99 |
| Diol (OH) | Voranol P1010 | 16.71 |
| Diol (OH) | Voranol P400 | 7.66 |
| Flame retardant/plasticizer | Cereclor S42 | 8.70 |
| Surfactant | Struksilon 8002 | 1.39 |
| Catalyst | DMDEE | 0.35 |
| Sum | | 75.19 |
| Blowing agents | Propane | 6.47 |
| | Isobutane | 9.02 |
| | Dimethylether | 9.32 |
| | Total blowing agents | 24.81 |
| Overall total | | 100.00 |

The Suprasec 5025 was obtained from Huntsman. It contained 43 wt % mMDI and TDI was undetectable. It was a mixture of 2-core, 3-core, 4-core, 5-core and even higher core polyisocyanates and had an average functionality of 2.7. The 2-ethyl hexanol was obtained from Univar. The two diols were obtained from Dow Chemical Company. All the alcohols used were free of any triols or higher functionality alcohols. The Cereclor S42 was obtained from Ineos. The Struksilon 8002 is chemically a modified polyether polydimethyl siloxane and was obtained from Schill and Seilacher, and the catalyst was obtained from Huntsman. The blowing agents were obtained (in sequence of listing) from Total, Scharr and Akzo Nobel.

The foam composition excluding the propellants was analyzed and tested using the test methods described in the analytical section, and the results as shown in Table 2 were found. The results for the foam composition and for the prepolymer composition are calculated values.

TABLE 2

| Property | Foam composition | Foam excl. propellants | Prepolymer composition |
|---|---|---|---|
| mMDI (wt %) | <0.80 | <1.06 | <1.24 |
| TDI (wt %) | ND* | ND* | ND* |
| Mono- and dual-reacted MDI (wt %) | >3.0 | >4.0 | >4.6 |
| Index (—) | 167 | 167 | 167 |
| Eq. ratio Monol/NCO (eq %) | 30.1 | 30.1 | 30.1 |
| Residual free NCO (wt %) | 3.86 | 5.14 | 5.97 |

*= Not detectable

The monol and diols used did not contain any triols, so the equivalent ratio of towards isocyanate tri- and higher functional compounds relative to NCO initially present was 0%.

The foam composition was used for applying a PU foam onto a substrate, and the foam was found to have acceptable properties of extrudability, i.e. its extrusion behaviour from the pressure container, hardness, elasticity, density, skin formation, and yield, the latter meaning the expansion behaviour.

Having now fully described this invention, it will be appreciated by those skilled in the art that the invention can be performed within a wide range of parameters within what is claimed, without departing from the spirit and scope of the invention. As understood by those of skill in the art, the overall invention, as defined by the claims, encompasses other preferred embodiments not specifically enumerated herein.

The invention claimed is:

1. A composition for making a polyurethane foam, the composition comprising at least one propellant and a polyurethane prepolymer composition, the polyurethane prepolymer composition made from a polyisocyanate mixture wherein said mixture comprises, based on the weight of the polyisocyanates, at least 20 wt % methyl diphenyl diisocyanate monomer and at most 24.5 wt % of toluene diisocyanate monomer, at least one towards isocyanate polyfunctional reactive compound and at least one towards isocyanate monofunctional reactive compound, the polyurethane prepolymer composition
    a) containing less than 1.40 wt % of residual free methyl diphenyl diisocyanate monomer,
    b) containing at least 3 wt % total of methyl diphenyl diisocyanate monomers of which at least one of the two isocyanate functional groups has been reacted with a towards isocyanate monofunctional reactive compound,
    c) wherein the polyurethane prepolymer composition has an isocyanate index, expressed relative to all the towards isocyanate reactive functional groups involved in forming the polyurethane prepolymer composition, of at least 145 and at most 185,
    d) wherein the equivalents ratio of the towards isocyanate monofunctional reactive compounds relative to the amount of the isocyanate functional groups initially present is at least 21%, and
    e) wherein the equivalents ratio of towards isocyanate tri- and higher functional reactive compounds relative to the amount of the isocyanate functional groups initially present is at most 3.00%,
    whereby the concentrations, unless stated otherwise, are expressed relative to the total weight of the polyurethane prepolymer composition.

2. The composition according to claim 1, the polyurethane prepolymer composition having at least one of the following features, expressed on the same basis:
    a) containing at most 1.38 wt % of residual free methyl diphenyl diisocyanate monomer,
    b) containing at least 0.20 wt % of residual free methyl diphenyl diisocyanate monomer,
    c) containing at least 7 wt % total of methyl diphenyl diisocyanate monomers of which at least one of the two isocyanate functional groups has been reacted with a towards isocyanate monofunctional reactive compound,
    d) containing at most 77 wt % total of methyl diphenyl diisocyanate monomers of which at least one of the two isocyanate functional groups has been reacted with a towards isocyanate monofunctional reactive compound,
    e) the polyurethane prepolymer composition has an isocyanate index, expressed relative to all the towards isocyanate reactive functional groups involved in forming the polyurethane prepolymer composition, of at least 155,
    f) the polyurethane prepolymer composition has an isocyanate index, expressed relative to all the towards isocyanate reactive functional groups involved in forming the polyurethane prepolymer composition, of at most 175, and g) the equivalents ratio of the amount of towards isocyanate monofunctional reactive compounds relative to the amount of the isocyanate functional groups initially present is at most 50.0%.

3. The composition according to claim 1 containing a concentration of residual free isocyanate functions of at least 0.7% by weight, whereby the concentration is expressed relative to the total amount of the composition for making a polyurethane foam.

4. The composition according to claim 1 containing a concentration of residual free isocyanate functions of at most 5.5 wt %, whereby the concentration is expressed relative to the total amount of the composition for making a polyurethane foam.

5. The composition according to claim 1 further comprising, expressed relative to the total amount of the composition for making a polyurethane foam, at least one of the following:
   h) the at least one propellant in a total propellant concentration of at least 5% wt,
   i) the at least one propellant in a total propellant concentration of at most 40% wt,
   j) at least one compound selected from a plasticizer, a flame retardant, and a combination thereof, in a total plasticizer and flame retardant concentration of at least 0.5 wt %
   k) at least one compound selected from a plasticizer, a flame retardant, and a combination thereof, in a total plasticizer and flame retardant concentration of at most 20.0 wt %,
   l) at least one compound selected from a foam stabilizer, a surfactant, and combinations thereof, in a total foam stabilizer and surfactant concentration of at least 0.5 wt %,
   m) at least one compound selected from a foam stabilizer, a surfactant, and combinations thereof, in a total foam stabilizer and surfactant concentration of at most 5.0 wt %.

6. The composition according to claim 1 further comprising at least one additive selected from the group consisting of a catalyst, a flame retardant, a flame proofing agent, a solvent, a viscosity reducer, a UV stabilizer, a cell opening additive, and mixtures thereof.

7. The composition according to claim 1, wherein the towards isocyanate monofunctional reactive compound is selected from the group consisting of an alcohol, a secondary amine, a thiol, an acid, and mixtures thereof.

8. The composition according to claim 1 wherein the towards isocyanate monofunctional reactive compound is selected from the group consisting of the primary, secondary and tertiary alcohol variants of a saturated alkyl alcohol, the primary, secondary and tertiary alcohol variants of an aryl alcohol, the primary, secondary and tertiary alcohol variants of an alkylaryl alcohol, a polyol of which all except one alcohol functional group has been etherified with a monofunctional alcohol or esterified with a monobasic acid, the alkoxylated derivatives thereof, and mixtures thereof.

9. The composition according to claim 1 wherein the towards isocyanate monofunctional reactive compound is selected from the group consisting of C1-C36 alcohols, and mixtures thereof.

10. The composition according to claim 1 wherein the towards isocyanate monofunctional reactive compound has a molecular weight of at least 32.

11. The composition according to claim 1 wherein the towards isocyanate monofunctional reactive compound has a molecular weight of at most 480.

12. The composition according to claim 1 wherein the polyurethane prepolymer composition is further based on at least one polyisocyanate monomer selected from the group consisting of 3-core, 4-core, 5-core phenyl isocyanate monomers, and mixtures thereof.

13. The composition according to claim 1 wherein the polyurethane prepolymer composition is further based on an isocyanate selected from crude methyl diphenyl diisocyanate and polymeric methyl diphenyl diisocyanate.

14. The composition according to claim 1 wherein the remaining functionality of the polyisocyanate mixture, calculated based on the isocyanate monomer after reaction thereof with only all of the towards isocyanate reactive monofunctional compound, is at least 1.60.

15. The composition according to claim 1 wherein the remaining functionality of the polyisocyanate mixture, calculated based on the isocyanate monomer after reaction thereof with only all of the towards isocyanate reactive monofunctional compound, is at most 2.10.

16. The composition according to claim 1 wherein the equivalents ratio of towards isocyanate difunctional reactive compounds having a molecular weight of at most 100 g/mole, relative to the amount of the isocyanate functional groups, is at most 19.0%.

17. A pressure container containing the composition for making a polyurethane foam according to claim 1.

18. A polyurethane prepolymer composition for the production of the composition for making a polyurethane foam according to claim 1 based on a polyisocyanate mixture wherein said mixture comprises, based on the weight of the polyisocyanates, at least 20 wt % methyl diphenyl diisocyanate monomer and at most 24.5 wt % of toluene diisocyanate monomer, at least one towards isocyanate polyfunctional reactive compound, and at least one towards isocyanate monofunctional reactive compound, the polyurethane prepolymer composition
   a) containing at most 1.40 wt % of residual free methyl diphenyl diisocyanate monomer,
   b) containing at least 3 wt % total of methyl diphenyl diisocyanate monomers of which at least one of the two isocyanate functional groups has been reacted with a towards isocyanate monofunctional reactive compound, and
   c) having an isocyanate index, expressed relative to all the towards isocyanate reactive functional groups, of at least 145 and at most 185,
   d) wherein the equivalents ratio of the amount of the towards isocyanate monofunctional reactive compounds relative to the amount of the isocyanate functional groups initially present is at least 21%,
   e) wherein the equivalents ratio of towards isocyanate tri- and higher functional reactive compounds relative to the amount of the isocyanate functional groups initially present is at most 3.00%,
   whereby the towards isocyanate monofunctional reactive compound has a molecular weight of less than 500 and whereby the concentrations are expressed relative to the total amount of the polyurethane prepolymer composition.

19. The polyurethane prepolymer composition according to claim 18 having at least one of the following features:
   a) containing at most 1.38 wt % of residual free methyl diphenyl diisocyanate monomer,
   b) containing at least 0.20 wt % of residual free methyl diphenyl diisocyanate monomer,
   c) containing at least 7 wt % total of methyl diphenyl diisocyanate monomers of which at least one of the two isocyanate functional groups has been reacted with a towards isocyanate monofunctional reactive compound,
d) containing at most 77.0 wt % total of methyl diphenyl diisocyanate monomers of which at least one of the two isocyanate functional groups has been reacted with a towards isocyanate monofunctional reactive compound,
e) an isocyanate index, expressed relative to all the towards isocyanate reactive functional groups, of at least 155,
f) an isocyanate index, expressed relative to all the towards isocyanate reactive functional groups, of at most 175, and
g) the equivalents ratio of the amount of towards isocyanate monofunctional reactive compounds relative to the amount of the isocyanate functional groups initially present being at most 50.0%.

20. The polyurethane prepolymer composition according to claim 18 containing a concentration of residual free isocyanate functions of at least 1.0 wt %, the concentration based on the total amount of the polyurethane prepolymer composition.

21. The polyurethane prepolymer composition according to claim 18 containing a concentration of residual free isocyanate functions of at most 8.75% wt, the concentration based on the total amount of the polyurethane prepolymer composition.

22. The composition according to claim 18, wherein the towards isocyanate monofunctional reactive compound is selected from the group consisting of an alcohol, a secondary amine, a thiol, an acid, and mixtures thereof.

23. The composition according to claim 18 wherein the towards isocyanate monofunctional reactive compound is selected from the group consisting of C1-C36 alcohols, and mixtures thereof.

24. A method for the production of a polyurethane prepolymer composition comprising reacting a polyisocyanate mixture wherein said mixture comprises, based on the weight of the polyisocyanates, at least 20 wt % methyl diphenyl diisocyanate monomer and at most 24.5 wt % of toluene diisocyanate monomer, with at least one towards isocyanate polyfunctional reactive compound and at least one towards isocyanate monofunctional reactive compound, the polyurethane prepolymer composition
a) containing at most 1.40 wt % of residual free methyl diphenyl diisocyanate monomer,
b) containing at least 3 wt % total of methyl diphenyl diisocyanate monomers of which at least one of the two isocyanate functional groups has been reacted with a towards isocyanate monofunctional reactive compound, and
c) having an isocyanate index, expressed relative to all the towards isocyanate reactive functional groups, of at least 145 and at most 185,
d) wherein the equivalents ratio of the amount of the towards isocyanate monofunctional reactive compounds relative to the amount of the isocyanate functional groups initially present is at least 21%,
e) wherein the equivalents ratio of towards isocyanate tri- and higher functional reactive compounds relative to the amount of the isocyanate functional groups initially present is at most 3.00%,
whereby the towards isocyanate monofunctional reactive compound has a molecular weight of less than 500 and whereby the concentrations are expressed relative to the total amount of the polyurethane prepolymer composition.

25. The method according to claim 24 wherein the towards isocyanate monofunctional reactive compound is selected from a monofunctional alcohol and a mixture of monofunctional alcohols.

26. The method according to claim 24 wherein the towards isocyanate polyfunctional reactive compound is selected from a polyol and a polyol mixture.

27. The method according to claim 24 comprising in a first reaction step reacting the polyisocyanate mixture with the towards isocyanate polyfunctional reactive compound, and further reacting the product of the first reaction step in a second reaction step with the towards isocyanate monofunctional reactive compound to form the polyurethane prepolymer composition.

28. The method according to claim 24 comprising in a first reaction step reacting the polyisocyanate mixture with less than a stoichiometric amount of the towards isocyanate monofunctional reactive compound, followed by reacting in a second reaction step the product of the first reaction step with the towards isocyanate polyfunctional reactive compound to form the polyurethane prepolymer composition.

29. The method according to claim 24 wherein the reaction of the polyisocyanate mixture with the towards isocyanate monofunctional reactive compound and the reaction of the polyisocyanate mixture with the towards isocyanate polyfunctional reactive compound occur simultaneously.

30. The method according to claim 24 wherein the reaction with the towards isocyanate monofunctional reactive compound is performed in a pressure container.

* * * * *